(12) United States Patent
GuangHai

(10) Patent No.: US 8,068,097 B2
(45) Date of Patent: Nov. 29, 2011

(54) APPARATUS FOR DETECTING CONDUCTIVE MATERIAL OF A PAD LAYER OF A SENSING DEVICE

(75) Inventor: Li GuangHai, Shanghai (CN)

(73) Assignee: Cypress Semiconductor Corporation, San Jose, CA (US)

( * ) Notice: Subject to any disclaimer, the term of this patent is extended or adjusted under 35 U.S.C. 154(b) by 1019 days.

(21) Appl. No.: 11/477,179

(22) Filed: Jun. 27, 2006

(65) Prior Publication Data

US 2007/0296709 A1 Dec. 27, 2007

(51) Int. Cl.
*G06F 3/041* (2006.01)
(52) U.S. Cl. .............................. 345/173; 345/168
(58) Field of Classification Search .......... 345/168–174, 345/156; 455/186.2, 226.4; 341/22, 33
See application file for complete search history.

(56) References Cited

U.S. PATENT DOCUMENTS

| | | | |
|---|---|---|---|
| 3,921,167 A * | 11/1975 | Fox | ................. 307/116 |
| 4,103,252 A | 7/1978 | Bobick | |
| 4,736,191 A | 4/1988 | Matzke et al. | |
| 5,305,017 A | 4/1994 | Gerpheide | |
| 5,543,590 A | 8/1996 | Gillespie et al. | |
| 5,943,052 A | 8/1999 | Allen et al. | |
| 6,037,929 A | 3/2000 | Ogura et al. | |
| 6,188,391 B1 | 2/2001 | Seely et al. | |
| 6,262,717 B1 | 7/2001 | Donohue et al. | |
| 6,380,931 B1 | 4/2002 | Gillespie et al. | |
| 6,498,720 B2 | 12/2002 | Glad | |
| 6,574,095 B2 | 6/2003 | Suzuki | |
| 6,704,005 B2 | 3/2004 | Kato et al. | |
| 6,882,338 B2 * | 4/2005 | Flowers | ................. 345/174 |
| 6,999,009 B2 * | 2/2006 | Monney | ................. 341/34 |
| 2005/0159126 A1 * | 7/2005 | Wang | ................. 455/226.4 |
| 2006/0097992 A1 * | 5/2006 | Gitzinger et al. | ............. 345/173 |
| 2006/0232559 A1 * | 10/2006 | Chien et al. | ................... 345/168 |
| 2006/0262101 A1 * | 11/2006 | Layton et al. | ................. 345/173 |

FOREIGN PATENT DOCUMENTS

| | | |
|---|---|---|
| EP | 0 574 213 | 6/1993 |
| WO | WO 00/02188 A1 | 1/2000 |

OTHER PUBLICATIONS

Chapweske, Adam, "The PS/2 Mouse Interface", PS/2 Mouse Interfacing, 2001, 10 pages.
"The Virtual Keyboard: I-Tech Bluetooth/Serial Virtual Laser Keyboard available now!", The Virtual Laser Keyboard (VKB) online worldwide shop, http://www.virtual-laser-keyboard.com, 4 pages, dowloaded Apr. 13, 2006.
"CY8C21x34 Data Sheet", Cypress Semiconductore Corporation, CSR User Module, CSR v1.0, Oct. 6, 2005, pp. 1-36. "IBM PC keyboard", Wikipedia, the free encyclopedia, 3 pages, http://en.wikipedia.org/wiki/PC_keyboard.
Ryan Seguine, et al., "Layout Guidelines for PSoC™ CapSense™", Cypress Application Note AN2292, Revision B, Oct. 31, 2005, pp. 1-15.
Dennis Seguine, "Capacitive Switch Scan", Cypress Application Note AN2233a, Revision B, Apr. 14, 2005, pp. 1-6.

* cited by examiner

*Primary Examiner* — Amare Mengistu
*Assistant Examiner* — Hong Zhou

(57) ABSTRACT

An apparatus and method for distinguishing a particular button operation from among multiple button operations on a sensing device having multiple sensor elements that are electrically coupled together. The apparatus may include a sensing device having a first sensor element and a second element that are electrically coupled to detect a presence of a conductive object on the sensing device. The method may include detecting a presence of a conductive object on a sensing device having multiple sensor elements that are electrically coupled, each sensor element corresponding to a button operation, and distinguishing between the multiple button operations.

10 Claims, 13 Drawing Sheets

APPARATUS FOR DETECTING CONDUCTIVE MATERIAL OF A PAD LAYER OF A SENSING DEVICE

TECHNICAL FIELD

This invention relates to the field of user interface devices and, in particular, to touch-sensor devices.

BACKGROUND

Computing devices, such as notebook computers, personal data assistants (PDAs), and mobile handsets, have user interface devices, which are also known as human interface device (HID). One user interface device that is common is a touch-sensor button. A basis touch-sensor button emulates the function of a mechanical button. Touch-sensor buttons may be embedded into different types of operational panels of electronic devices. For example, touch-sensor buttons may be used on operational or control panels of household appliances, consumer electronics, mechanical devices, and the like. Touch-sensor buttons may also be used in conjunction with, or in place of, other user input devices, such as keyboards, mice, trackballs, or the like.

FIG. 1A illustrates a conventional sensing device having three touch-sensor buttons. Conventional sensing device 100 includes button 101, button 102, and button 103. These buttons are conventional touch-sensor buttons. These three buttons may be used for user input using a conductive object, such as a finger.

FIG. 1B illustrates a conventional sensing device of three touch-sensor buttons 101-103 coupled to a processing device 110. Processing device 110 is used to detect whether a conductive object is present on either, or none, of the touch-sensor buttons 101-103. To detect the presence of the conductive object, the processing device 110 may include capacitance sensors 104-106, which are coupled to buttons 101-103, respectively. The capacitance sensors of the processing device are coupled to the touch-sensor buttons in a one-to-one configuration. Accordingly, the processing device 110 scans the touch-sensor buttons 101-103 using the capacitance sensors 104-106, and measures the capacitance on the touch-sensor buttons 101-103.

Each of the conventional touch-sensor buttons 101-103 may be made of a sensor element of conductive material, such as copper-clad. The conductive material may be form shaped in a circular shape (illustrated in FIG. 1A), or even in a rectangular shape (illustrated in FIG. 1B). The touch-sensor buttons may be capacitance sensor buttons, which may be used as non-contact switches. These switches, when protected by an insulating layer, offer resistance to severe environments.

It should be noted that the conventional configuration of FIG. 1B includes a one-to-one configuration of touch-sensor buttons to capacitance sensors. There are other conventional configurations that may use less capacitance sensors to measure the capacitance on the three touch-sensor buttons. These conventional configurations, however, still require a one-to-one configuration of pins to touch-sensor buttons. Accordingly, by adding more buttons, the processing device needs to have more pins to correspond to the one-to-one configuration of pins to touch-sensor buttons. Similarly, by increasing the pin count, the scan time to scan the sensor elements increases. In addition, the memory of the processing device, which may be used to store program data and/or temporary data (e.g., raw measurement data, differential counts, baseline measurement data, and the like), increases by increasing the pin count.

Another conventional button is a one-pin resistor configuration. The one-pin resistors configuration includes a resistor for each button. As the button is pressed, the resistor is introduced into the circuit, as a voltage divider, dropping a reference voltage to a lower voltage level. When the button is pressed, the voltage on the pin is changed (e.g., lowered) due to the change in voltage introduced by the resistor. The one-pin resistor configuration may be used in a keyboard of multiple keyboard keys. The keyboard keys each include a resistor coupled to each button. The voltage changes based on which key has been pressed, allowing the controller to determine which key has been pressed.

Another conventional one-pin-per button configuration is a resistance matrix of a conventional keyboard. The resistance matrix includes multiple rows and columns. All the rows are each connected to a pull-up resistor, and all the columns are each connected to a pull-down transistor. Above the resistance matrix there are multiple buttons (e.g., keyboard keys). Upon pressing a button, the corresponding row and column (X, Y) will be shorted together. These conventional resistance scan matrix designs have large pin counts because every row and every column is connected to a pin. The pin count for these conventional resistance matrix keyboards is the sum of the number of rows and the number of columns. Having a large pin count, may increase the die area of the circuit, or alternatively, or may decrease the robustness of the circuit by decreasing the possibility of additional functionality in the same circuit with limited pins. Also, the resistance scan matrix keyboards cannot be built in very small areas because it is limited by the pull-up resistor and mechanical button for each keyboard key. For example, the mechanical button of each keyboard key may have an area of about 0.5 centimeters (cm)×0.5 cm, the total keyboard area will be at least 25.25 $cm^2$ for a keyboard having 101 keyboard keys (e.g., 101×0.5 cm×0.5 cm=25.25 $cm^2$).

BRIEF DESCRIPTION OF THE DRAWINGS

The present invention is illustrated by way of example, and not by way of limitation, in the figures of the accompanying drawings.

DETAILED DESCRIPTION

Figure 1A:
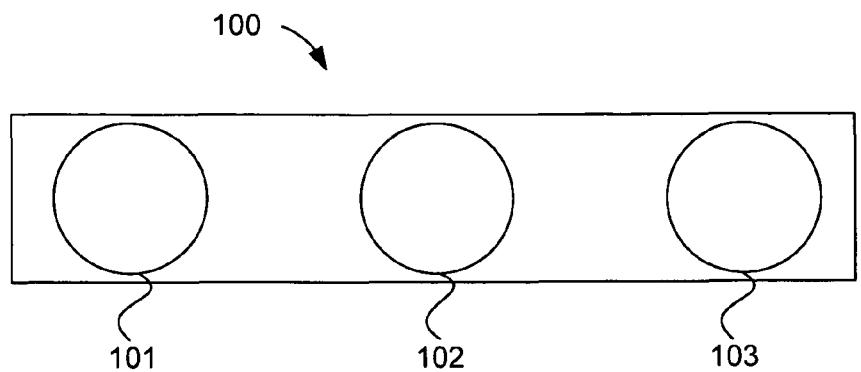
FIG. 1A illustrates a conventional touch-sensor pad.
Figure 1B:
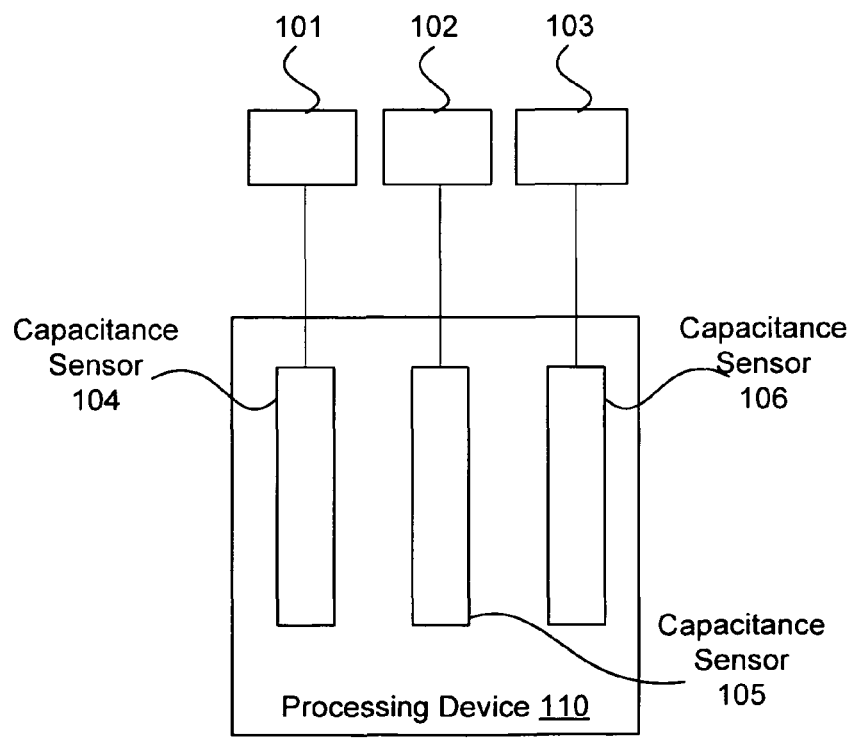
FIG. 1B illustrates a conventional linear touch-sensor slider.

Described herein is an apparatus and method for distinguishing a particular button operation from among multiple button operations on a sensing device having multiple sensor elements that are electrically coupled together. The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the spirit and scope of the present invention.

Embodiments of a method and apparatus are described to distinguish between multiple button operations on multiple sensor elements of a sensing device that are electrically coupled to each other and to a single pin of a processing device. In one embodiment, the method may include detecting a presence of a conductive object on a sensing device having multiple sensor elements that are electrically coupled, each sensor element corresponding to a button operation, and distinguishing between the multiple button operations. In one embodiment, the apparatus may include a sensing device coupled to a processing device. The sensing device may include a first sensor element that performs a first button operation and a second element that performs a second button operation. The first and second buttons are electrically coupled to detect a presence of a conductive object on the sensing device. The processing device may be configured to distinguish a particular button operation from among the first and second button operations. In effect, the processing device may be configured to determine which button has been activated by the presence of the conductive object using one pin coupled to the two (or more) buttons of the sensing device.

As described herein, sensitivity of the sensing device is proportional to surface area of the conductive material of the button (button area). One pin that is coupled to multiple buttons may be used to detect multiple button operations if the area differences of these buttons areas are larger enough to create enough sensitivity to distinguish from among the multiple button operations. For example, if the sensitivity range of the first button (T1), the second button (T2), and the third button (T3) are configured to be greater than the threshold level (of detecting a presence of a conductive object), the button operations performed by activating the corresponding buttons (T1, T2, and T3) can be distinguished.

By using one pin to detect multiple button operations, the power of the electronic system may be reduced. In addition, the scan time of the sensing device may be reduced because multiple buttons may be scanned on one pin, instead of on multiple pins, like in the conventional systems. The embodiments described herein may be used for applications of touch-sensor buttons. Alternatively, the embodiments described herein may be implemented in a keyboard. For example, in a traditional stack-up of a conventional keyboard there are four layers, plastic film layer, insulator layer, pad layer, and routing layer. In one embodiment, multiple keyboard keys may be implemented using multiple buttons areas in the pad layer. The pad layer may operate as a conductive object that is detected by the sensing device. The keyboard keys press against the pad layer, allowing the button area of the pad layer that corresponds to the pressed keyboard key to move towards the routing layer. The routing layer also has conductive material (e.g., button area) that operates as a sensor element to detect the presence of a conductive object, and route the signal from the sensing device. As the button area of the pad layer approaches the button area of the routing layer, the routing layer detects the presence of the button area of the pad layer (e.g., conductive object). Different surface areas may be used between the multiple buttons of the keyboard in order to create different sensitivities ranges for distinguishing between the multiple button operations performed on the keyboard. This embodiment may also be used to reduce the pin count for the keyboard.

Figure 2:
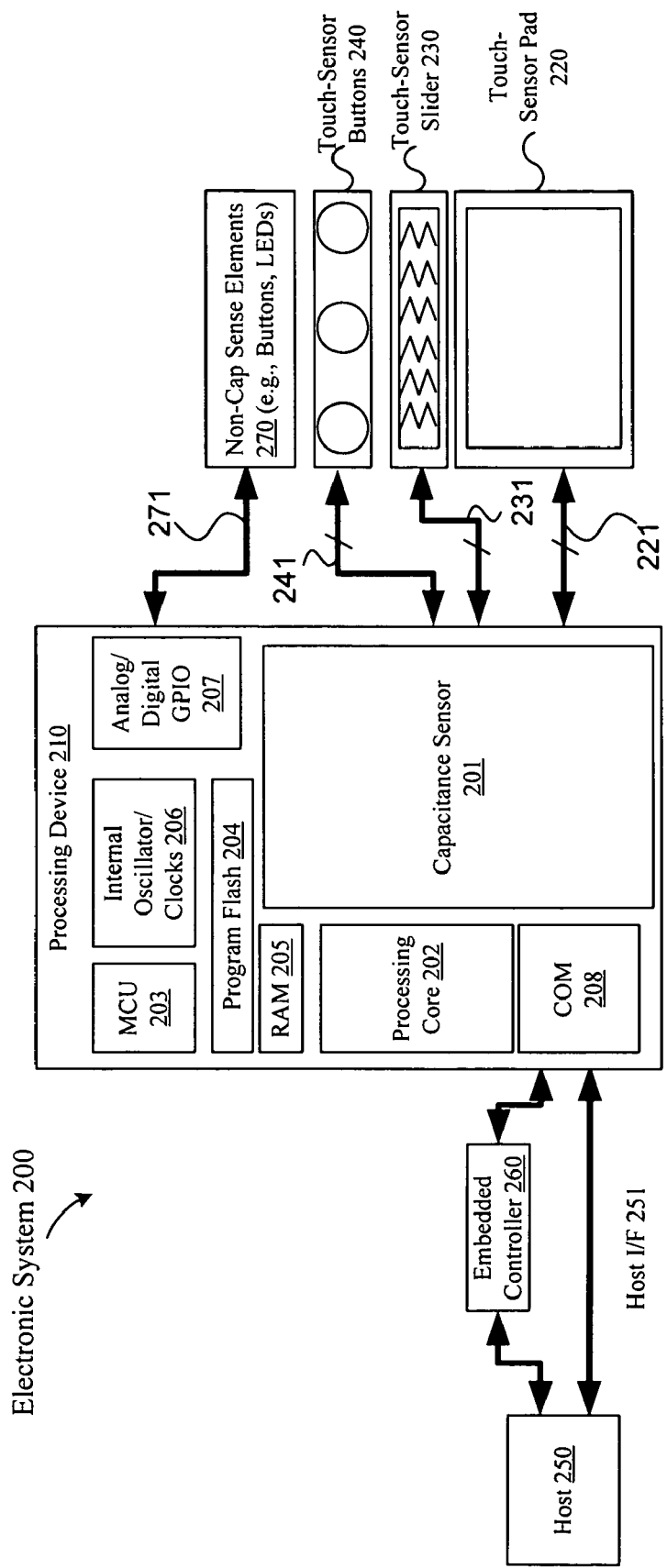
FIG. 2 illustrates a block diagram of one embodiment of an electronic system having a processing device for detecting a presence of a conductive object.

FIG. 2 illustrates a block diagram of one embodiment of an electronic system having a processing device for detecting a presence of a conductive object. Electronic system 200 includes processing device 210, touch-sensor pad 220, touch-sensor slider 230, touch-sensor buttons 240, host processor 250, embedded controller 260, and non-capacitance sensor elements 270. The processing device 210 may include analog and/or digital general purpose input/output ("GPIO") ports 207. GPIO ports 207 may be programmable. GPIO ports 207 may be coupled to a Programmable Interconnect and Logic ("PIL"), which acts as an interconnect between GPIO ports 207 and a digital block array of the processing device 210 (not illustrated). The digital block array may be configured to implement a variety of digital logic circuits (e.g., DAC, digital filters, digital control systems, etc.) using, in one embodiment, configurable user modules ("UMs"). The digital block array may be coupled to a system bus. Processing device 210 may also include memory, such as random access memory (RAM) 205 and program flash 204. RAM 205 may be static RAM (SRAM), and program flash 204 may be a non-volatile storage, which may be used to store firmware (e.g., control algorithms executable by processing core 202 to implement operations described herein). Processing device 210 may also include a memory controller unit (MCU) 203 coupled to memory and the processing core 202.

The processing device 210 may also include an analog block array (not illustrated). The analog block array is also coupled to the system bus. Analog block array also may be configured to implement a variety of analog circuits (e.g., ADC, analog filters, etc.) using, in one embodiment, configurable UMs. The analog block array may also be coupled to the GPIO 207.

As illustrated, capacitance sensor 201 may be integrated into processing device 210. Capacitance sensor 201 may include analog I/O for coupling to an external component, such as touch-sensor pad 220, touch-sensor slider 230, touch-sensor buttons 240, and/or other devices. Capacitance sensor 201 and processing device 202 are described in more detail below.

It should be noted that the embodiments described herein are not limited to touch-sensor pads for notebook implementations, but can be used in other capacitive sensing implementations, for example, the sensing device may be a touch screen, touch-sensor slider 230, or a touch-sensor button 240 (e.g., capacitance sensing button). It should also be noted that the embodiments described herein may be implemented in other sensing technologies than capacitive sensing, such as resistive, optical imaging, surface wave, infrared, dispersive signal, and strain gauge technologies. Similarly, the operations described herein are not limited to notebook cursor operations, but can include other operations, such as lighting control (dimmer), volume control, graphic equalizer control, speed control, or other control operations requiring gradual adjustments. It should also be noted that these embodiments of capacitive sensing implementations may be used in conjunction with non-capacitive sensing elements, including but not limited to pick buttons, sliders (ex. display brightness and contrast), scroll-wheels, multi-media control (ex. volume, track advance, etc) handwriting recognition and numeric keypad operation.

In one embodiment, the electronic system 200 includes a touch-sensor pad 220 coupled to the processing device 210 via bus 221. Touch-sensor pad 220 may include a multi-dimension sensor array. The multi-dimension sensor array includes multiple sensor elements, organized as rows and columns. In another embodiment, the electronic system 200 includes a touch-sensor slider 230 coupled to the processing device 210 via bus 231. Touch-sensor slider 230 may include a single-dimension sensor array. The single-dimension sensor array includes multiple sensor elements, organized as rows, or alternatively, as columns. In another embodiment, the electronic system 200 includes a touch-sensor button 240 coupled to the processing device 210 via bus 241. Touch-sensor button 240 may include a single-dimension or multi-dimension sensor array. The single- or multi-dimension sensor array includes multiple sensor elements. For a touch-sensor button, the sensor elements may be coupled together to detect a presence of a conductive object over the entire surface of the sensing device. Alternatively, the touch-sensor button 240 has a single sensor element to detect the presence of the conductive object. In one embodiment, the touch-sensor button 240 may be a capacitance sensor element. Capacitance sensor elements may be used as non-contact switches. These switches, when protected by an insulating layer, offer resistance to severe environments.

The electronic system 200 may include any combination of one or more of the touch-sensor pad 220, touch-sensor slider 230, and/or touch-sensor button 240. In another embodiment, the electronic system 200 may also include non-capacitance sensor elements 270 coupled to the processing device 210 via bus 271. The non-capacitance sensor elements 270 may include buttons, light emitting diodes (LEDs), and other user interface devices, such as a mouse, a keyboard, or other functional keys that do not require capacitance sensing. In one embodiment, buses 271, 241, 231, and 221 may be a single bus. Alternatively, these buses may be configured into any combination of one or more separate buses.

The processing device may also provide value-added functionality such as keyboard control integration, LEDs, battery charger and general purpose I/O, as illustrated as non-capacitance sensor elements 270. Non-capacitance sensor elements 270 are coupled to the GPIO 207.

Processing device 210 may include internal oscillator/clocks 206 and communication block 208. The oscillator/clocks block 206 provides clock signals to one or more of the components of processing device 210. Communication block 208 may be used to communicate with an external component, such as a host processor 250, via host interface (I/F) line 251. Alternatively, processing block 210 may also be coupled to embedded controller 260 to communicate with the external components, such as host 250. Interfacing to the host 250 can be through various methods. In one exemplary embodiment, interfacing with the host 250 may be done using a standard PS/2 interface to connect to an embedded controller 260, which in turn sends data to the host 250 via low pin count (LPC) interface. In some instances, it may be beneficial for the processing device 210 to do both touch-sensor pad and keyboard control operations, thereby freeing up the embedded controller 260 for other housekeeping functions. In another exemplary embodiment, interfacing may be done using a universal serial bus (USB) interface directly coupled to the host 250 via host interface line 251. Alternatively, the processing device 210 may communicate to external components, such as the host 250 using industry standard interfaces, such as USB, PS/2, inter-integrated circuit (I2C) bus, or system packet interfaces (SPI). The host 250 and/or embedded controller 260 may be coupled to the processing device 210 with a ribbon or flex cable from an assembly, which houses the sensing device and processing device.

In one embodiment, the processing device 210 is configured to communicate with the embedded controller 260 or the host 250 to send and/or receive data. The data may be a command or alternatively a signal. In an exemplary embodiment, the electronic system 200 may operate in both standard-mouse compatible and enhanced modes. The standard-mouse compatible mode utilizes the HID class drivers already built into the Operating System (OS) software of host 250. These drivers enable the processing device 210 and sensing device to operate as a standard cursor control user interface device, such as a two-button PS/2 mouse. The enhanced mode may enable additional features such as scrolling (reporting absolute position) or disabling the sensing device, such as when a mouse is plugged into the notebook. Alternatively, the processing device 210 may be configured to communicate with the embedded controller 260 or the host 250, using non-OS drivers, such as dedicated touch-sensor pad drivers, or other drivers known by those of ordinary skill in the art.

In other words, the processing device 210 may operate to communicate data (e.g., commands or signals) using hardware, software, and/or firmware, and the data may be communicated directly to the processing device of the host 250, such as a host processor, or alternatively, may be communicated to the host 250 via drivers of the host 250, such as OS drivers, or other non-OS drivers. It should also be noted that the host 250 may directly communicate with the processing device 210 via host interface 251.

In one embodiment, the data sent to the host 250 from the processing device 210 includes click, double-click, movement of the cursor, scroll-up, scroll-down, scroll-left, scroll-right, step Back, and step Forward. Alternatively, other user interface device commands may be communicated to the host 250 from the processing device 210. These commands may be based on gestures occurring on the sensing device that are recognized by the processing device, such as tap, push, hop, and zigzag gestures. Alternatively, other commands may be recognized. Similarly, signals may be sent that indicate the recognition of these operations.

In particular, a tap gesture, for example, may be when the finger (e.g., conductive object) is on the sensing device for less than a threshold time. If the time the finger is placed on the touchpad is greater than the threshold time it may be considered to be a movement of the cursor, in the x- or y-axes. Scroll-up, scroll-down, scroll-left, and scroll-right, step back, and step-forward may be detected when the absolute position of the conductive object is within a pre-defined area, and movement of the conductive object is detected.

Processing device 210 may reside on a common carrier substrate such as, for example, an integrated circuit (IC) die substrate, a multi-chip module substrate, or the like. Alternatively, the components of processing device 210 may be one or more separate integrated circuits and/or discrete components. In one exemplary embodiment, processing device 210 may be a Programmable System on a Chip (PSOC™) processing device, manufactured by Cypress Semiconductor Corporation, San Jose, Calif. Alternatively, processing device 210 may be one or more other processing devices known by those of ordinary skill in the art, such as a microprocessor or central processing unit, a controller, special-purpose processor, digital signal processor (DSP), an application specific integrated circuit (ASIC), a field programmable gate array (FPGA), or the like. In an alternative embodiment, for example, the processing device may be a network processor having multiple processors including a core unit and multiple microengines. Additionally, the processing device may include any combination of general-purpose processing device(s) and special-purpose processing device(s).

It should also be noted that the embodiments described herein are not limited to having a configuration of a processing device coupled to a host, but may include a system that measures the capacitance on the sensing device and sends the raw data to a host computer where it is analyzed by an application. In effect the processing that is done by processing device 210 may also be done in the host.

In one embodiment, the method and apparatus described herein may be implemented in a fully self-contained touch-sensor pad, which outputs fully processed x/y movement and gesture data signals or data commands to a host. In another embodiment, the method and apparatus may be implemented in be a touch-sensor pad, which outputs x/y movement data and also finger presence data to a host, and where the host processes the received data to detect gestures. In another embodiment, the method and apparatus may be implemented in a touch-sensor pad, which outputs raw capacitance data to a host, where the host processes the capacitance data to compensate for quiescent and stray capacitance, and calculates x/y movement and detects gestures by processing the capacitance data. Alternatively, the method and apparatus may be implemented in a touch-sensor pad, which outputs pre-processed capacitance data to a host, where the touchpad processes the capacitance data to compensate for quiescent and stray capacitance, and the host calculates x/y movement and detects gestures from the pre-processed capacitance data.

In one embodiment, the electronic system that includes the embodiments described herein may be implemented in a conventional laptop touch-sensor pad. Alternatively, it may be implemented in a wired or wireless keyboard integrating a touch-sensor pad, which is itself connected to a host. In such an implementation, the processing described above as being performed by the "host" may be performed in part or in whole by the keyboard controller, which may then pass fully processed, pre-processed or unprocessed data to the system host. In another embodiment, the embodiments may be implemented in a mobile handset (e.g., cell phone) or other electronic devices where the touch-sensor pad may operate in one of two or more modes. For example, the touch-sensor pad may operate either as a touch-sensor pad for x/y positioning and gesture recognition, or as a keypad or other array of touch-sensor buttons and/or sliders.

Capacitance sensor 201 may be integrated into the IC of the processing device 210, or alternatively, in a separate IC. Alternatively, descriptions of capacitance sensor 201 may be generated and compiled for incorporation into other integrated circuits. For example, behavioral level code describing capacitance sensor 201, or portions thereof, may be generated using a hardware descriptive language, such as VHDL or Verilog, and stored to a machine-accessible medium (e.g., CD-ROM, hard disk, floppy disk, etc.). Furthermore, the behavioral level code can be compiled into register transfer level ("RTL") code, a netlist, or even a circuit layout and stored to a machine-accessible medium. The behavioral level code, the RTL code, the netlist, and the circuit layout all represent various levels of abstraction to describe capacitance sensor 201.

It should be noted that the components of electronic system 200 may include all the components described above. Alternatively, electronic system 200 may include only some of the components described above.

In one embodiment, electronic system 200 may be used in a notebook computer. Alternatively, the electronic device may be used in other applications, such as a mobile handset, a personal data assistant (PDA), a keyboard, a television, a remote control, a monitor, a handheld multi-media device, a handheld video player, a handheld gaming device, or a control panel.

In one embodiment, capacitance sensor 201 may be a capacitive switch relaxation oscillator (CSR). The CSR may have an array of capacitive touch switches using a current-programmable relaxation oscillator, an analog multiplexer, digital counting functions, and high-level software routines to compensate for environmental and physical switch variations. The switch array may include combinations of independent switches, sliding switches (e.g., touch-sensor slider), and touch-sensor pads implemented as a pair of orthogonal sliding switches. The CSR may include physical, electrical, and software components. The physical component may include the physical switch itself, typically a pattern constructed on a printed circuit board (PCB) with an insulating cover, a flexible membrane, or a transparent overlay. The electrical component may include an oscillator or other means to convert a changed capacitance into a measured signal. The electrical component may also include a counter or timer to measure the oscillator output. The software component may include detection and compensation software algorithms to convert the count value into a switch detection decision. For example, in the case of slide switches or X-Y touch-sensor pads, a calculation for finding position of the conductive object to greater resolution than the physical pitch of the switches may be used.

It should be noted that there are various known methods for measuring capacitance. Although the embodiments described herein are described using a relaxation oscillator, the present embodiments are not limited to using relaxation oscillators, but may include other methods, such as current versus voltage phase shift measurement, resistor-capacitor charge timing, capacitive bridge divider, charge transfer, or the like.

The current versus voltage phase shift measurement may include driving the capacitance through a fixed-value resistor to yield voltage and current waveforms that are out of phase by a predictable amount. The drive frequency can be adjusted to keep the phase measurement in a readily measured range. The resistor-capacitor charge timing may include charging the capacitor through a fixed resistor and measuring timing on the voltage ramp. Small capacitor values may require very large resistors for reasonable timing. The capacitive bridge divider may include driving the capacitor under test through a fixed reference capacitor. The reference capacitor and the capacitor under test form a voltage divider. The voltage signal is recovered with a synchronous demodulator, which may be done in the processing device 210. The charge transfer may be conceptually similar to an R-C charging circuit. In this method, $C_P$ is the capacitance being sensed. $C_{SUM}$ is the summing capacitor, into which charge is transferred on successive cycles. At the start of the measurement cycle, the voltage on $C_{SUM}$ is reset. The voltage on $C_{SUM}$ increases exponentially (and only slightly) with each clock cycle. The time for this voltage to reach a specific threshold is measured with a counter. Additional details regarding these alternative embodiments have not been included so as to not obscure the present embodiments, and because these alternative embodiments for measuring capacitance are known by those of ordinary skill in the art.

Figure 3A:
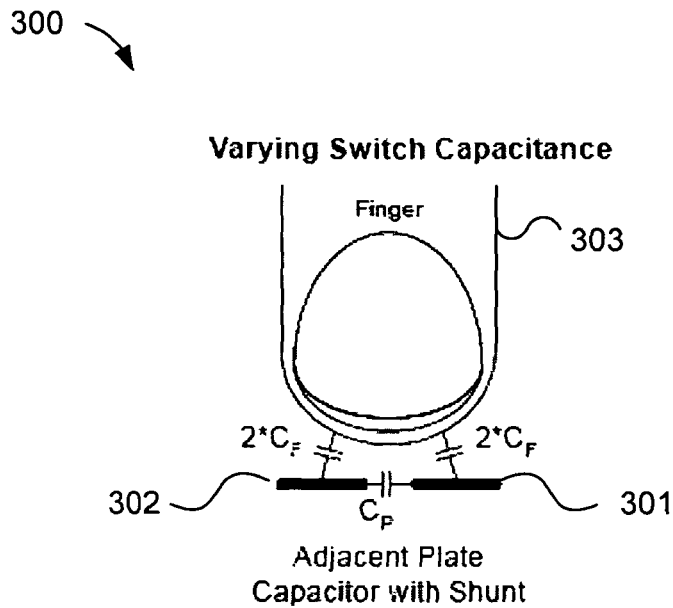
FIG. 3A illustrates a varying switch capacitance.

FIG. 3A illustrates a varying switch capacitance. In its basic form, a capacitive switch 300 is a pair of adjacent plates 301 and 302. There is a small edge-to-edge capacitance Cp, but the intent of switch layout is to minimize the base capacitance Cp between these plates. When a conductive object 303 (e.g., finger) is placed in proximity to the two plate 301 and 302, there is a capacitance 2*Cf between one electrode 301 and the conductive object 303 and a similar capacitance 2*Cf between the conductive object 303 and the other electrode 302. The capacitance between one electrode 301 and the conductive object 303 and back to the other electrode 302 adds in parallel to the base capacitance Cp between the plates 301 and 302, resulting in a change of capacitance Cf. Capacitive switch 300 may be used in a capacitance switch array. The capacitance switch array is a set of capacitors where one side of each is grounded. Thus, the active capacitor (as represented in FIG. 3C as capacitor 351) has only one accessible side. The presence of the conductive object 303 increases the capacitance (Cp+Cf) of the switch 300 to ground. Determining switch activation is then a matter of measuring change in the capacitance (Cf) or capacitance variation. Switch 300 is also known as a grounded variable capacitor. In one exemplary embodiment, Cf may range from approximately 10-30 picofarads (pF). Alternatively, other ranges may be used.

The conductive object in this case is a finger, alternatively, this technique may be applied to any conductive object, for example, a conductive door switch, position sensor, or conductive pen in a stylus tracking system (e.g., stylus).

Figure 3B:
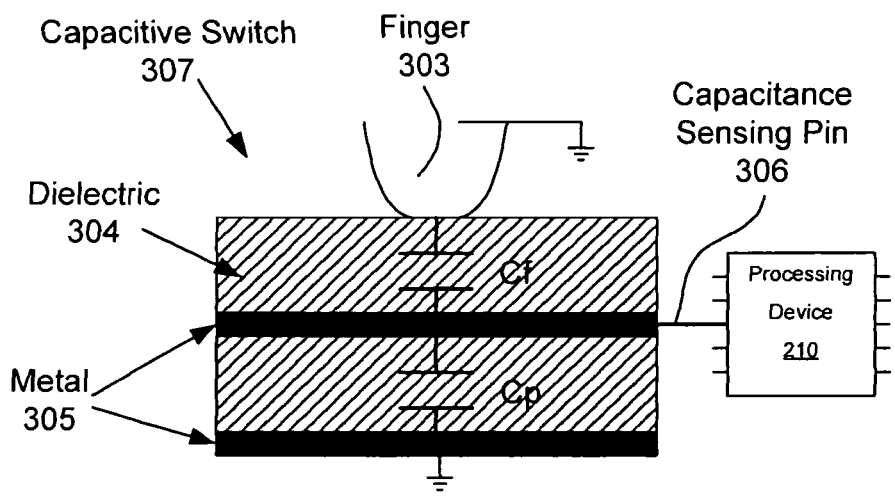
FIG. 3B illustrates one embodiment of a sensing device coupled to a processing device.
Figure 3C:
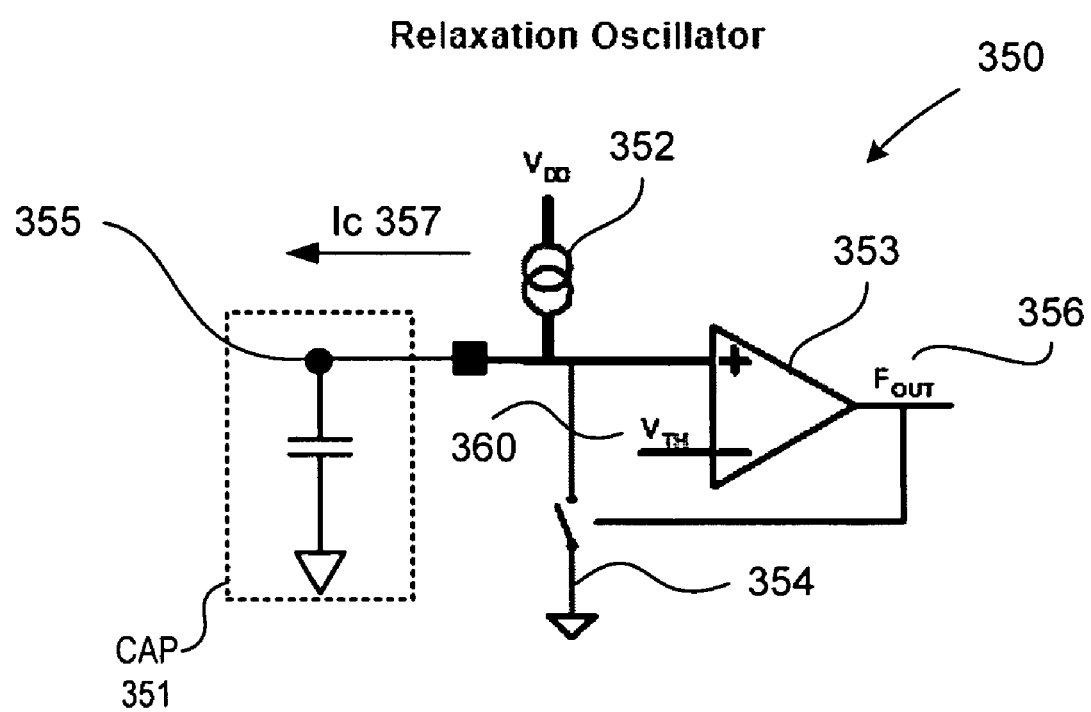
FIG. 3C illustrates one embodiment of a relaxation oscillator.

FIG. 3B illustrates one embodiment of a capacitive switch 307 coupled to a processing device 210. Capacitive switch 307 illustrates the capacitance as seen by the processing device 210 on the capacitance sensing pin 306. As described above, when a conductive object 303 (e.g., finger) is placed in proximity to one of the metal plates 305, there is a capacitance, Cf, between the metal plate and the conductive object 303 with respect to ground. Also, there is a capacitance, Cp, between the two metal plates. Accordingly, the processing device 210 can measure the change in capacitance, capacitance variation Cf, as the conductive object is in proximity to the metal plate 305. Above and below the metal plate that is closest to the conductive object 303 is dielectric material 304. The dielectric material 304 above the metal plate 305 can be the overlay, as described in more detail below. The overlay may be non-conductive material used to protect the circuitry to environmental elements and to insulate the user's finger (e.g., conductive object) from the circuitry. Capacitance switch 307 may be a sensor element of a touch-sensor pad, a touch-sensor slider, or a touch-sensor button.

FIG. 3C illustrates one embodiment of a relaxation oscillator. The relaxation oscillator 350 is formed by the capacitance to be measured on capacitor 351, a charging current source 352, a comparator 353, and a reset switch 354. It should be noted that capacitor 351 is representative of the capacitance measured on a sensor element of a sensor array. The relaxation oscillator is coupled to drive a charging current (Ic) 357 in a single direction onto a device under test ("DUT") capacitor, capacitor 351. As the charging current piles charge onto the capacitor 351, the voltage across the capacitor increases with time as a function of Ic 357 and its capacitance C. Equation (1) describes the relation between current, capacitance, voltage and time for a charging capacitor.

$$CdV = I_C dt \qquad (1)$$

The relaxation oscillator begins by charging the capacitor 351 from a ground potential or zero voltage and continues to pile charge on the capacitor 351 at a fixed charging current Ic 357 until the voltage across the capacitor 351 at node 355 reaches a reference voltage or threshold voltage, $V_{TH}$ 360. At the threshold voltage $V_{TH}$ 360, the relaxation oscillator allows the accumulated charge at node 355 to discharge (e.g., the capacitor 351 to "relax" back to the ground potential) and then the process repeats itself. In particular, the output of comparator 353 asserts a clock signal $F_{OUT}$ 356 (e.g., $F_{OUT}$ 356 goes high), which enables the reset switch 354. This resets the voltage on the capacitor at node 355 to ground and the charge cycle starts again. The relaxation oscillator outputs a relaxation oscillator clock signal ($F_{OUT}$ 356) having a frequency ($f_{RO}$) dependent upon capacitance C of the capacitor 351 and charging current Ic 357.

The comparator trip time of the comparator 353 and reset switch 354 add a fixed delay. The output of the comparator 353 is synchronized with a reference system clock to guarantee that the comparator reset time is long enough to completely reset the charging voltage on capacitor 351. This sets a practical upper limit to the operating frequency. For example, if capacitance C of the capacitor 351 changes, then $f_{RO}$ will change proportionally according to Equation (1). By comparing $f_{RO}$ of $F_{OUT}$ 356 against the frequency ($f_{REF}$) of a known reference system clock signal (REF CLK), the change in capacitance ΔC can be measured. Accordingly, equations (2) and (3) below describe that a change in frequency between $F_{OUT}$ 356 and REF CLK is proportional to a change in capacitance of the capacitor 351.

$$\Delta C \propto \Delta f, \text{ where} \qquad (2)$$

$$\Delta f = f_{RO} - f_{REF}. \qquad (3)$$

In one embodiment, a frequency comparator may be coupled to receive relaxation oscillator clock signal ($F_{OUT}$ 356) and REF CLK, compare their frequencies $f_{RO}$ and $f_{REF}$, respectively, and output a signal indicative of the difference Δf between these frequencies. By monitoring Δf one can determine whether the capacitance of the capacitor 351 has changed.

In one exemplary embodiment, the relaxation oscillator 350 may be built using a programmable timer (e.g., 555 timer) to implement the comparator 353 and reset switch 354. Alternatively, the relaxation oscillator 350 may be built using other circuiting. Relaxation oscillators are known by those of ordinary skill in the art, and accordingly, additional details regarding their operation have not been included so as to not obscure the present embodiments.

Figure 4:
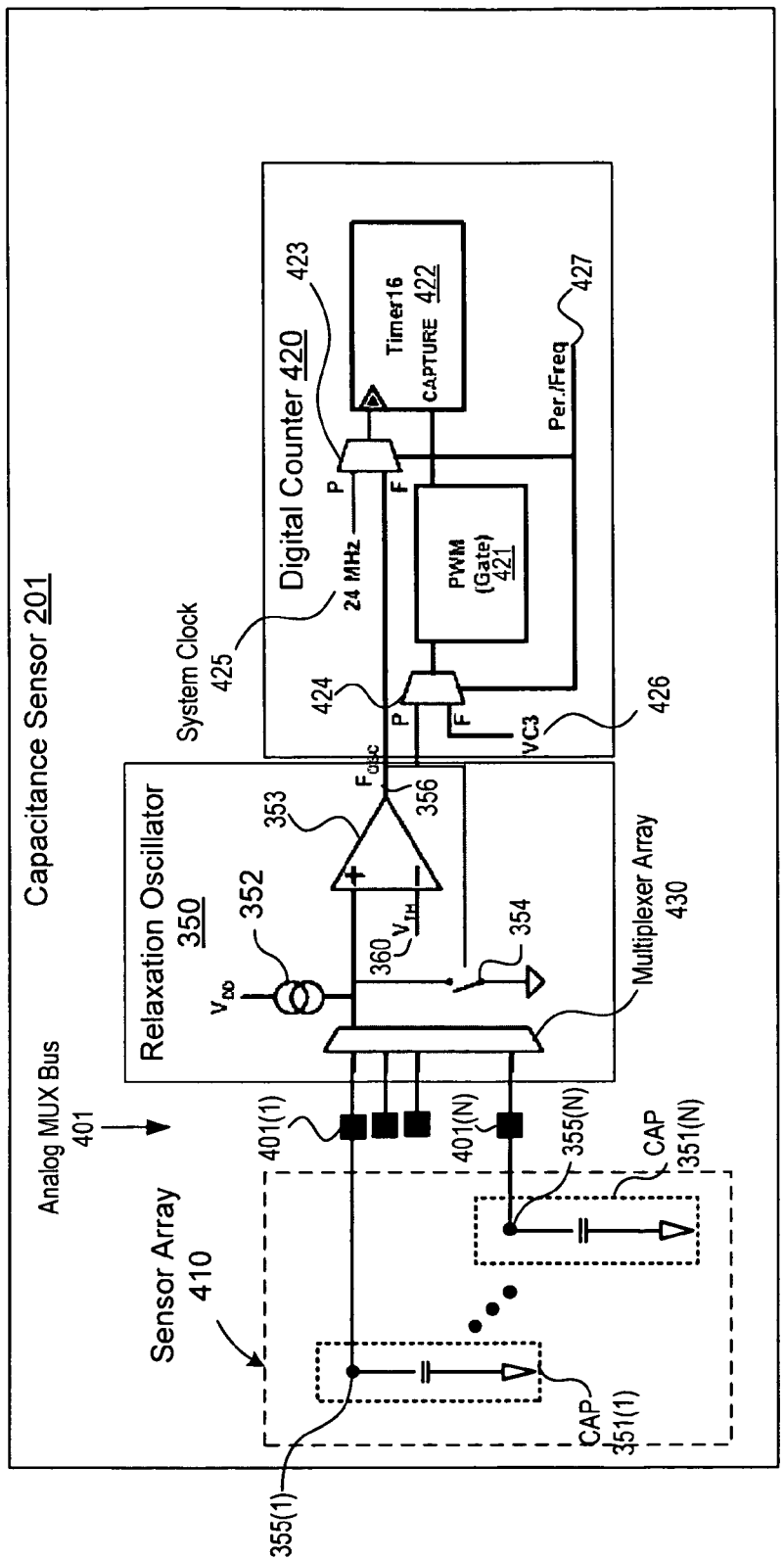
FIG. 4 illustrates a block diagram of one embodiment of a capacitance sensor including a relaxation oscillator and digital counter.

FIG. 4 illustrates a block diagram of one embodiment of a capacitance sensor including a relaxation oscillator and digital counter. Capacitance sensor 201 of FIG. 4 includes a sensor array 410 (also known as a switch array), relaxation oscillator 350, and a digital counter 420. Sensor array 410 includes sensor elements 355(1)-355(N), where N is a positive integer value that represents the number of rows (or alternatively columns) of the sensor array 410. Each sensor element is represented as a capacitor, as described above with respect to FIG. 3B. The sensor array 410 is coupled to relaxation oscillator 350 via an analog bus 401 having multiple pins 401(1)-401(N). In one embodiment, the sensor array 410 may be a single-dimension sensor array including the sensor elements 355(1)-355(N), where N is a positive integer value that represents the number of sensor elements of the single-dimension sensor array. The single-dimension sensor array 410 provides output data to the analog bus 401 of the processing device 210 (e.g., via lines 231). Alternatively, the sensor array 410 may be a multi-dimension sensor array including the sensor elements 355(1)-355(N), where N is a positive integer value that represents the number of sensor elements of the multi-dimension sensor array. The multi-dimension sensor array 410 provides output data to the analog bus 401 of the processing device 210 (e.g., via bus 221).

Relaxation oscillator 350 of FIG. 4 includes all the components described with respect to FIG. 3C, and a selection circuit 430. The selection circuit 430 is coupled to the sensor elements 355(1)-355(N), the reset switch 354, the current source 352, and the comparator 353. Selection circuit 430 may be used to allow the relaxation oscillator 350 to measure capacitance on multiple sensor elements (e.g., rows or columns). The selection circuit 430 may be configured to sequentially select a sensor element of the multiple sensor elements to provide the charge current and to measure the capacitance of each sensor element. In one exemplary embodiment, the selection circuit 430 is a multiplexer array of the relaxation oscillator 350. Alternatively, selection circuit may be other circuitry outside the relaxation oscillator 350, or even outside the capacitance sensor 201 to select the sensor element to be measured. Capacitance sensor 201 may include one relaxation oscillator and digital counter for the sensor elements of the sensor array. Alternatively, capacitance sensor 201 may include multiple relaxation oscillators and digital counters to measure capacitance on the sensor elements of the sensor array. The multiplexer array may also be used to ground the sensor elements that are not being measured. This may be done in conjunction with a dedicated pin in the GPIO port 207.

In another embodiment, the capacitance sensor 201 may be configured to simultaneously scan the sensor elements, as opposed to being configured to sequentially scan the sensor elements as described above. For example, the sensing device may include a sensor array having multiple rows and columns. The rows may be scanned simultaneously, and the columns may be scanned simultaneously.

In one exemplary embodiment, the voltages on all of the rows of the sensor array are simultaneously moved, while the voltages of the columns are held at a constant voltage, with the complete set of sampled points simultaneously giving a profile of the conductive object in a first dimension. Next, the voltages on all of the rows are held at a constant voltage, while the voltages on all the rows are simultaneously moved, to obtain a complete set of sampled points simultaneously giving a profile of the conductive object in the other dimension.

In another exemplary embodiment, the voltages on all of the rows of the sensor array are simultaneously moved in a positive direction, while the voltages of the columns are moved in a negative direction. Next, the voltages on all of the rows of the sensor array are simultaneously moved in a negative direction, while the voltages of the columns are moved in a positive direction. This technique doubles the effect of any transcapacitance between the two dimensions, or conversely, halves the effect of any parasitic capacitance to the ground. In both methods, the capacitive information from the sensing process provides a profile of the presence of the conductive object to the sensing device in each dimension. Alternatively, other methods for scanning known by those of ordinary skill in the art may be used to scan the sensing device.

Digital counter 420 is coupled to the output of the relaxation oscillator 350. Digital counter 420 receives the relaxation oscillator output signal 356 ($F_{OUT}$). Digital counter 420 is configured to count at least one of a frequency or a period of the relaxation oscillator output received from the relaxation oscillator.

As described above with respect to the relaxation oscillator 350, when a finger or conductive object is placed on the switch, the capacitance increases from Cp to Cp+Cf so the relaxation oscillator output signal 356 ($F_{OUT}$) decreases. The relaxation oscillator output signal 356 ($F_{OUT}$) is fed to the digital counter 420 for measurement. There are two methods for counting the relaxation oscillator output signal 356, frequency measurement and period measurement. In one embodiment, the digital counter 420 may include two multiplexers 423 and 424. Multiplexers 423 and 424 are configured to select the inputs for the PWM 421 and the timer 422 for the two measurement methods, frequency and period measurement methods. Alternatively, other selection circuits may be used to select the inputs for the PWM 421 and the timer 422. In another embodiment, multiplexers 423 and 424 are not included in the digital counter, for example, the digital counter 420 may be configured in one, or the other, measurement configuration.

In the frequency measurement method, the relaxation oscillator output signal 356 is counted for a fixed period of time. The timer 422 is read to obtain the number of counts during the gate time. This method works well at low frequencies where the oscillator reset time is small compared to the oscillator period. A pulse width modulator (PWM) 421 is clocked for a fixed period by a derivative of the system clock, VC3 426 (which is a divider from system clock 425, e.g., 24 MHz). Pulse width modulation is a modulation technique that generates variable-length pulses to represent the amplitude of an analog input signal; in this case VC3 426. The output of PWM 421 enables timer 422 (e.g., 16-bit). The relaxation oscillator output signal 356 clocks the timer 422. The timer 422 is reset at the start of the sequence, and the count value is read out at the end of the gate period.

In the period measurement method, the relaxation oscillator output signal 356 gates a timer 422, which is clocked by the system clock 425 (e.g., 24 MHz). In order to improve sensitivity and resolution, multiple periods of the oscillator are counted with the PWM 421. The output of PWM 421 is used to gate the timer 422. In this method, the relaxation oscillator output signal 356 drives the clock input of PWM 421. As described above, pulse width modulation is a modulation technique that generates variable-length pulses to represent the amplitude of an analog input signal; in this case the relaxation oscillator output signal 356. The output of the PWM 421 enables timer 422 (e.g., 16-bit), which is clocked at the system clock frequency 425 (e.g., 24 MHz). When the output of PWM 421 is asserted (e.g., goes high), the count starts by releasing the capture control. When the terminal count of the PWM 421 is reached, the capture signal is asserted (e.g., goes high), stopping the count and setting the PWM's interrupt. The timer value is read in this interrupt. The relaxation oscillator 350 is indexed to the next switch (e.g., capacitor 351(2)) to be measured and the count sequence is started again.

The two counting methods may have equivalent performance in sensitivity and signal-to-noise ratio (SNR). The period measurement method may have a slightly faster data acquisition rate, but this rate is dependent on software loads and the values of the switch capacitances. The frequency measurement method has a fixed-switch data acquisition rate.

The length of the timer 422 and the detection time required for the switch are determined by sensitivity requirements. Small changes in the capacitance on capacitor 351 result in small changes in frequency. In order to find these small changes, it may be necessary to count for a considerable time.

At startup (or boot) the switches (e.g., capacitors 351(1)-(N)) are scanned and the count values for each switch with no actuation are stored as a baseline array (Cp). The presence of a finger on the switch is determined by the difference in counts between a stored value for no switch actuation and the acquired value with switch actuation, referred to here as Δn. The sensitivity of a single switch is approximately:

$$\frac{\Delta n}{n} = \frac{Cf}{Cp} \tag{4}$$

The value of Δn should be large enough for reasonable resolution and clear indication of switch actuation. This drives switch construction decisions.

Cf should be as large a fraction of Cp as possible. In one exemplary embodiment, the fraction of Cf/Cp ranges between approximately 0.01 to approximately 2.0. Alternatively, other fractions may be used for Cf/Cp. Since Cf is determined by finger area and distance from the finger to the switch's conductive traces (through the over-lying insulator), the baseline capacitance Cp should be minimized. The baseline capacitance Cp includes the capacitance of the switch pad plus any parasitics, including routing and chip pin capacitance.

In switch array applications, variations in sensitivity should be minimized. If there are large differences in Δn, one switch may actuate at 1.0 cm, while another may not actuate until direct contact. This presents a non-ideal user interface device. There are numerous methods for balancing the sensitivity. These may include precisely matching on-board capacitance with PC trace length modification, adding balance capacitors on each switch's PC board trace, and/or adapting a calibration factor to each switch to be applied each time the switch is tested.

In one embodiment, the PCB design may be adapted to minimize capacitance, including thicker PCBs where possible. In one exemplary embodiment, a 0.062 inch thick PCB is used. Alternatively, other thicknesses may be used, for example, a 0.015 inch thick PCB.

It should be noted that the count window should be long enough for Δn to be a "significant number." In one embodiment, the "significant number" can be as little as 10, or alternatively, as much as several hundred. In one exemplary embodiment, where Cf is 1.0% of Cp (a typical "weak" switch), and where the switch threshold is set at a count value of 20, n is found to be:

$$n = \Delta n \cdot \frac{Cf}{Cp} = 2000 \tag{5}$$

Adding some margin to yield 2500 counts, and running the frequency measurement method at 1.0 MHz, the detection time for the switch is 2.5 microseconds. In the frequency measurement method, the frequency difference between a switch with and without actuation (i.e., CP+CF vs. CP) is approximately:

$$\Delta n = \frac{t_{count} \cdot i_C}{V_{TH}} \frac{Cf}{Cp^2} \tag{6}$$

This shows that the sensitivity variation between one channel and another is a function of the square of the difference in the two channels' static capacitances. This sensitivity difference can be compensated using routines in the high-level Application Programming Interfaces (APIs).

In the period measurement method, the count difference between a switch with and without actuation (i.e., CP+CF vs. CP) is approximately:

$$\Delta n = N_{Periods} \cdot \frac{Cf \cdot V_{TH}}{i_C} \cdot f_{SysClk} \tag{7}$$

The charge currents are typically lower and the period is longer to increase sensitivity, or the number of periods for which $f_{SysClk}$ is counted can be increased. In either method, by matching the static (parasitic) capacitances Cp of the individual switches, the repeatability of detection increases, making all switches work approximately at the same difference. Compensation for this variation can be done in software at runtime. The compensation algorithms for both the frequency method and period method may be included in the high-level APIs.

Some implementations of this circuit use a current source programmed by a fixed-resistor value. If the range of capacitance to be measured changes, external components, (i.e., the resistor) should be adjusted.

Using the multiplexer array 430, multiple sensor elements may be sequentially scanned to provide current to and measure the capacitance from the capacitors (e.g., sensor elements), as described above. In other words, while one sensor element is being measured, the remaining sensor elements are grounded using the GPIO port 207. This drive and multiplex arrangement bypasses the existing GPIO to connect the selected pin to an internal analog multiplexer (mux) bus. The capacitor charging current (e.g., current source 352) and reset switch 354 are connected to the analog mux bus. This may limit the pin-count requirement to simply the number of switches (e.g., capacitors 351(1)-351(N)) to be addressed. In one exemplary embodiment, no external resistors or capacitors are required inside or outside the processing device 210 to enable operation.

The capacitor charging current for the relaxation oscillator 350 is generated in a register programmable current output DAC (also known as IDAC). Accordingly, the current source 352 is a current DAC or IDAC. The IDAC output current may be set by an 8-bit value provided by the processing device 210, such as from the processing core 202. The 8-bit value may be stored in a register or in memory.

Estimating and measuring PCB capacitances may be difficult; the oscillator-reset time may add to the oscillator period (especially at higher frequencies); and there may be some variation to the magnitude of the IDAC output current with operating frequency. Accordingly, the optimum oscillation frequency and operating current for a particular switch array may be determined to some degree by experimentation.

In many capacitive switch designs the two "plates" (e.g., 301 and 302) of the sensing capacitor are actually adjacent sensor elements that are electrically isolated (e.g., PCB pads or traces), as indicated in FIG. 3A. Typically, one of these plates is grounded. Layouts for touch-sensor slider (e.g., linear slide switches) and touch-sensor pad applications have switches that are immediately adjacent. In this case, all of the switches that are not active are grounded through the GPIO 207 of the processing device 210 dedicated to that pin. The actual capacitance between adjacent plates is small (Cp), but the capacitance of the active plate (and its PCB trace back to the processing device 210) to ground, when detecting the presence of the conductive object 303, may be considerably higher (Cp+Cf). The capacitance of two parallel plates is given by the following equation:

$$C = \varepsilon_0 \cdot \varepsilon_R \cdot \frac{A}{d} = \varepsilon_R \cdot 8.85 \cdot \frac{A}{d} \text{ pF/m} \quad (8)$$

The dimensions of equation (8) are in meters. This is a very simple model of the capacitance. The reality is that there are fringing effects that substantially increase the switch-to-ground (and PCB trace-to-ground) capacitance.

Switch sensitivity (i.e., actuation distance) may be increased by one or more of the following: 1) increasing board thickness to increase the distance between the active switch and any parasitics; 2) minimizing PC trace routing underneath switches; 3) utilizing a grided ground with 50% or less fill if use of a ground plane is absolutely necessary; 4) increasing the spacing between switch pads and any adjacent ground plane; 5) increasing pad area; 6) decreasing thickness of any insulating overlay; or 7) verifying that there is no air-gap between the PC pad surface and the touching finger.

There is some variation of switch sensitivity as a result of environmental factors. A baseline update routine, which compensates for this variation, may be provided in the high-level APIs.

Sliding switches are used for control requiring gradual adjustments. Examples include a lighting control (dimmer), volume control, graphic equalizer, and speed control. These switches are mechanically adjacent to one another. Actuation of one switch results in partial actuation of physically adjacent switches. The actual position in the sliding switch is found by computing the centroid location of the set of switches activated.

In applications for touch-sensor sliders (e.g., sliding switches) and touch-sensor pads it is often necessary to determine finger (or other capacitive object) position to more resolution than the native pitch of the individual switches. The contact area of a finger on a sliding switch or a touch-pad is often larger than any single switch. In one embodiment, in order to calculate the interpolated position using a centroid, the array is first scanned to verify that a given switch location is valid. The requirement is for some number of adjacent switch signals to be above a noise threshold. When the strongest signal is found, this signal and those immediately adjacent are used to compute a centroid:

$$Centroid = \frac{n_{i-1} \cdot (i-1) + n_i i + n_{i+1} \cdot (i+1)}{n_{i-1} + n_i + n_{i+1}} \quad (9)$$

The calculated value will almost certainly be fractional. In order to report the centroid to a specific resolution, for example a range of 0 to 100 for 12 switches, the centroid value may be multiplied by a calculated scalar. It may be more efficient to combine the interpolation and scaling operations into a single calculation and report this result directly in the desired scale. This may be handled in the high-level APIs. Alternatively, other methods may be used to interpolate the position of the conductive object.

A physical touchpad assembly is a multi-layered module to detect a conductive object. In one embodiment, the multi-layer stack-up of a touchpad assembly includes a PCB, an adhesive layer, and an overlay. The PCB includes the processing device 210 and other components, such as the connector to the host 250, necessary for operations for sensing the capacitance. These components are on the non-sensing side of the PCB. The PCB also includes the sensor array on the opposite side, the sensing side of the PCB. Alternatively, other multi-layer stack-ups may be used in the touchpad assembly.

The PCB may be made of standard materials, such as FR4 or Kapton™ (e.g., flexible PCB). In either case, the processing device 210 may be attached (e.g., soldered) directly to the sensing PCB (e.g., attached to the non-sensing side of the PCB). The PCB thickness varies depending on multiple variables, including height restrictions and sensitivity requirements. In one embodiment, the PCB thickness is at least approximately 0.3 millimeters (mm). Alternatively, the PCB may have other thicknesses. It should be noted that thicker PCBs may yield better results. The PCB length and width is dependent on individual design requirements for the device on which the sensing device is mounted, such as a notebook or mobile handset.

The adhesive layer is directly on top of the PCB sensing array and is used to affix the overlay to the overall touchpad assembly. Typical material used for connecting the overlay to the PCB is non-conductive adhesive such as 3M 467 or 468. In one exemplary embodiment, the adhesive thickness is approximately 0.05 mm. Alternatively, other thicknesses may be used.

The overlay may be non-conductive material used to protect the PCB circuitry to environmental elements and to insulate the user's finger (e.g., conductive object) from the circuitry. Overlay can be ABS plastic, polycarbonate, glass, or polyester film, such as Mylar™ polyester film. Alternatively, other materials known by those of ordinary skill in the art may be used. In one exemplary embodiment, the overlay has a thickness of approximately 1.0 mm. In another exemplary embodiment, the overlay thickness has a thickness of approximately 2.0 mm. Alternatively, other thicknesses may be used.

The sensor array may be a grid-like pattern of sensor elements (e.g., capacitive elements) used in conjunction with the processing device 210 to detect a presence of a conductive object, such as finger, to a resolution greater than that which is native. The touch-sensor pad layout pattern maximizes the area covered by conductive material, such as copper, in relation to spaces necessary to define the rows and columns of the sensor array.

Figure 5A:
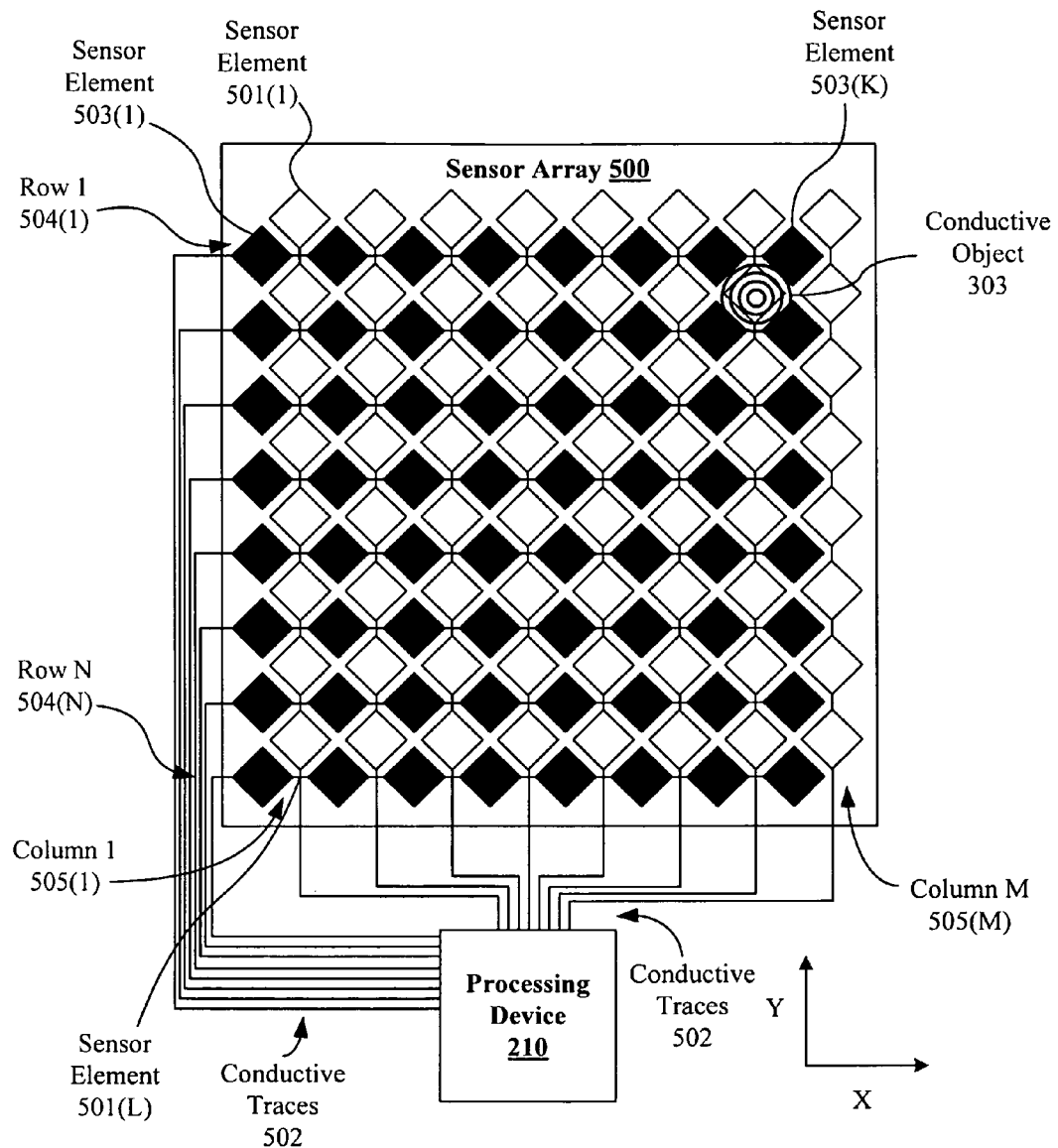
FIG. 5A illustrates a top-side view of one embodiment of a sensor array of sensor elements for detecting a presence of a conductive object on the sensor array of a touch-sensor pad.

FIG. 5A illustrates a top-side view of one embodiment of a sensor array of sensor elements for detecting a presence of a conductive object 303 on the sensor array 500 of a touch-sensor pad. Touch-sensor pad 220 includes a sensor array 500. Sensor array 500 includes rows 504(1)-504(N) and columns 505(1)-505(M), where N is a positive integer value representative of the number of rows and M is a positive integer value representative of the number of columns. Each row includes sensor elements 503(1)-503(K), where K is a positive integer value representative of the number of sensor elements in the row. Each column includes a sensor elements 501(1)-501(L), where L is a positive integer value representative of the number of sensor elements in the column. Accordingly, sensor array is an N×M sensor matrix. The N×M sensor matrix, in conjunction with the processing device 210, is configured to detect a position of a presence of the conductive object 303 in the x-, and y-directions.

Figure 5B:
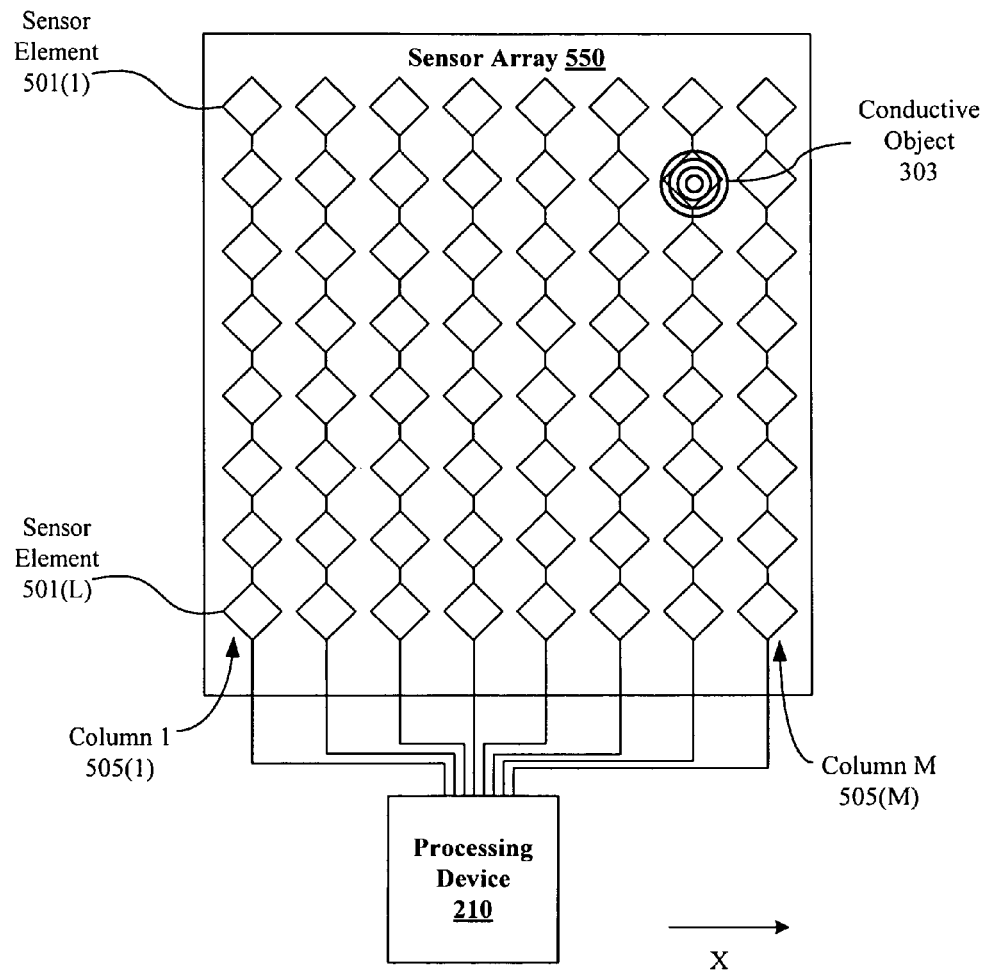
FIG. 5B illustrates a top-side view of one embodiment of a sensor array of sensor elements for detecting a presence of a conductive object on the sensor array of a touch-sensor slider.

FIG. 5B illustrates a top-side view of one embodiment of a sensor array of sensor elements for detecting a presence of a conductive object 303 on the sensor array 550 of a touch-sensor slider. Touch-sensor slider 230 includes a sensor array 550. Sensor array 550 includes columns 504(1)-504(M), where M is a positive integer value representative of the number of columns. Each column includes sensor elements 501(1)-501(L), where L is a positive integer value representative of the number of sensor elements in the column. Accordingly, sensor array is a 1×M sensor matrix. The 1×M sensor matrix, in conjunction with the processing device 210, is configured to detect a position of a presence of the conductive object 303 in the x-direction. It should be noted that sensor array 500 may be configured to function as a touch-sensor slider 230.

Alternating columns in FIG. 5A correspond to x- and y-axis elements. The y-axis sensor elements 503(1)-503(K) are illustrated as black diamonds in FIG. 5A, and the x-axis sensor elements 501(1)-501(L) are illustrated as white diamonds in FIG. 5A and FIG. 5B. It should be noted that other shapes may be used for the sensor elements. In another embodiment, the columns and row may include vertical and horizontal bars (e.g., rectangular shaped bars); however, this design may include additional layers in the PCB to allow the vertical and horizontal bars to be positioned on the PCB so that they are not in contact with one another.

Figure 5C:
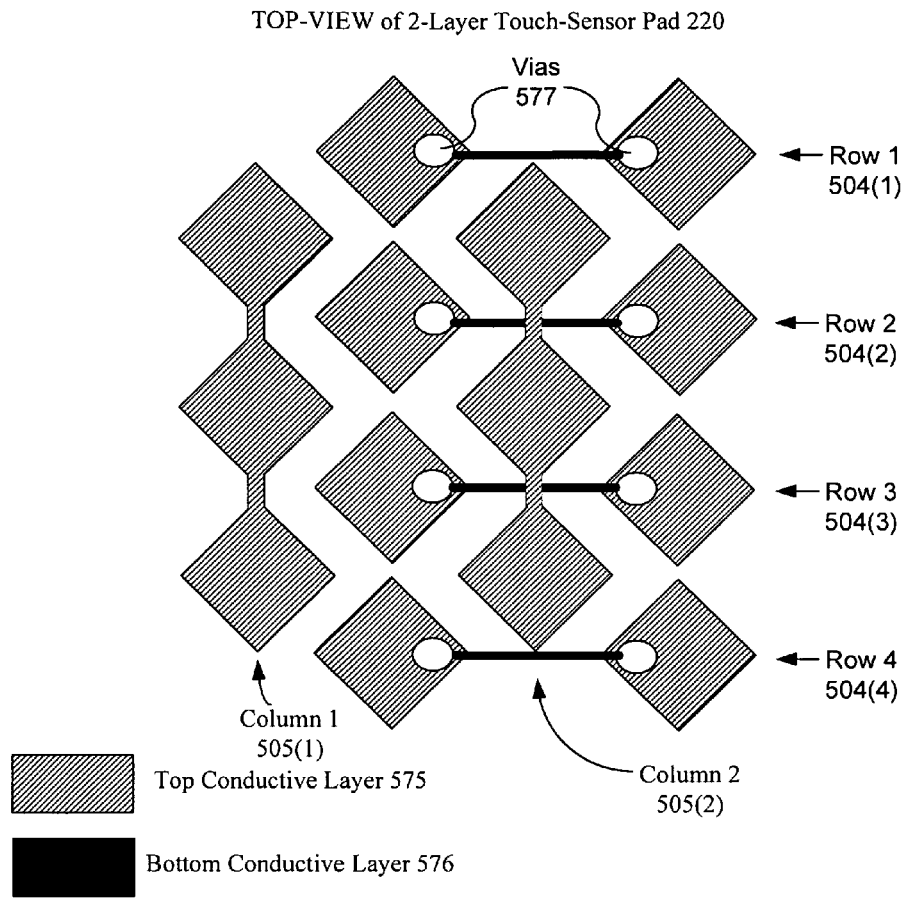
FIG. 5C illustrates a top-side view of one embodiment of a two-layer touch-sensor pad.
Figure 5D:
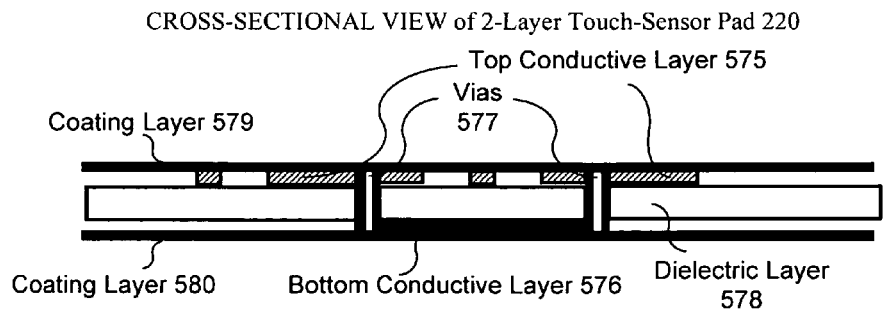
FIG. 5D illustrates a side view of one embodiment of the two-layer touch-sensor pad of FIG. 5C.

FIG. 5C and 5D illustrate top-side and side views of one embodiment of a two-layer touch-sensor pad. Touch-sensor pad, as illustrated in FIG. 5C and 5D, include the first two columns 505(1) and 505(2), and the first four rows 504(1)-504(4) of sensor array 500. The sensor elements of the first column 501(1) are connected together in the top conductive layer 575, illustrated as hashed diamond sensor elements and connections. The diamond sensor elements of each column, in effect, form a chain of elements. The sensor elements of the second column 501(2) are similarly connected in the top conductive layer 575. The sensor elements of the first row 504(1) are connected together in the bottom conductive layer 576 using vias 577, illustrated as black diamond sensor elements and connections. The diamond sensor elements of each row, in effect, form a chain of elements. The sensor elements of the second, third, and fourth rows 504(2)-504(4) are similarly connected in the bottom conductive layer 576.

As illustrated in FIG. 5D, the top conductive layer 575 includes the sensor elements for both the columns and the rows of the sensor array, as well as the connections between the sensor elements of the columns of the sensor array. The bottom conductive layer 576 includes the conductive paths that connect the sensor elements of the rows that reside in the top conductive layer 575. The conductive paths between the sensor elements of the rows use vias 577 to connect to one another in the bottom conductive layer 576. Vias 577 go from the top conductive layer 575, through the dielectric layer 578, to the bottom conductive layer 576. Coating layers 579 and 580 are applied to the surfaces opposite to the surfaces that are coupled to the dielectric layer 578 on both the top and bottom conductive layers 575 and 576.

It should be noted that the space between coating layers 579 and 580 and dielectric layer 578, which does not include any conductive material, may be filled with the same material as the coating layers or dielectric layer. Alternatively, it may be filled with other materials.

It should be noted that the present embodiments are not be limited to connecting the sensor elements of the rows using vias to the bottom conductive layer 576, but may include connecting the sensor elements of the columns using vias to the bottom conductive layer 576. Furthermore, the present embodiments are not limited two-layer configurations, but may include disposing the sensor elements on multiple layers, such as three- or four-layer configurations.

When pins are not being sensed (only one pin is sensed at a time), they are routed to ground. By surrounding the sensing device (e.g., touch-sensor pad) with a ground plane, the exterior elements have the same fringe capacitance to ground as the interior elements.

In one embodiment, an IC including the processing device 210 may be directly placed on the non-sensor side of the PCB. This placement does not necessary have to be in the center. The processing device IC is not required to have a specific set of dimensions for a touch-sensor pad, nor a certain number of pins. Alternatively, the IC may be placed somewhere external to the PCB.

Figure 6A:
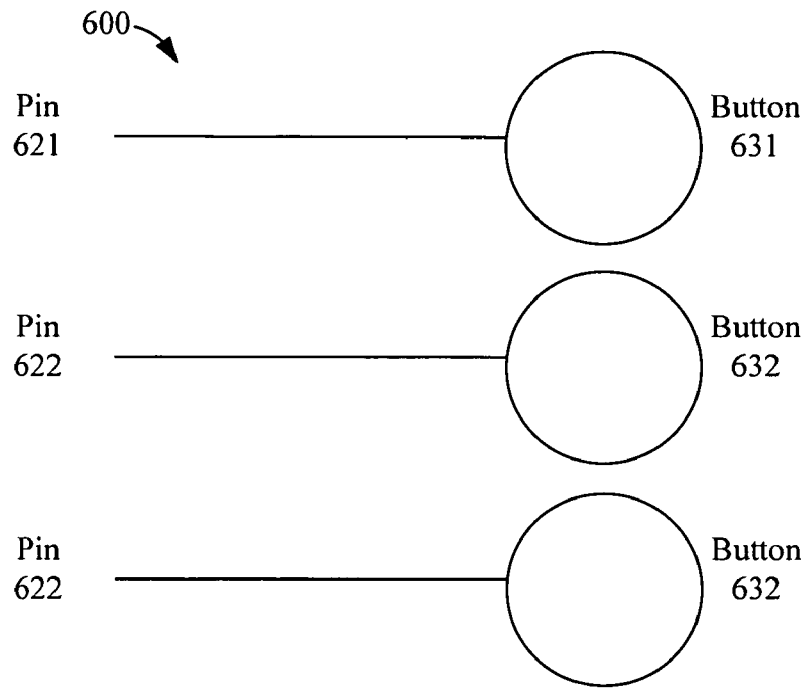
FIG. 6A illustrates one embodiment of a sensing device having three buttons and three pins.

FIG. 6A illustrates one embodiment of a sensing device having three buttons and three pins. Sensing device 600 has three buttons 631, 632, and 633, which are each coupled to a pin, pins 621, 622, and 623, respectively. Button 631 corresponds to a first button operation, button 632 corresponds to a second button operation, and button 633 corresponds to a third button operation. In other words, as button 631 is touched, the sensing device 600 recognizes and performs the first button operation. Similarly, the second and third button operations are recognized and performed when the buttons 632 and 633 are touched, respectively. In this embodiment, one pin per button is used to detect the button operations.

Figure 6B:
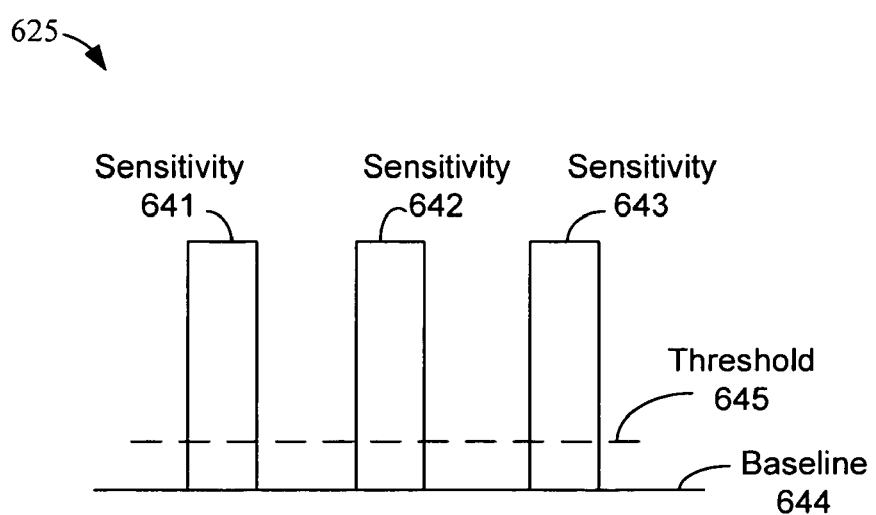
FIG. 6B illustrates one embodiment of a graph of the sensitivity of each button of FIG. 6A.

FIG. 6B illustrates one embodiment of a graph 625 of the sensitivity of each button of FIG. 6A. The sensing device of FIG. 6A may be a capacitance sensing device. In capacitance sensing devices, a button operation can be detected by the sensing device 600 when the sensitivity of the button is greater than a threshold. For example, as button 631 is touched (e.g., activated), the sensitivity 641 can be measured as being above threshold 645. So long as the sensitivity 641 is above the threshold 645, the button operation that corresponds to button 631 is recognized and performed.

This sensing device includes a one-to-one ratio of pins to buttons. Accordingly, this sensing device requires additional pins to implement additional button operations. For example, using the one-to-one configuration in a keyboard design may require 101 pins to implement the 101 keyboard buttons that are present in a full keyboard.

The following is an equation that shows that the sensitivity of a button is proportional to the surface area (A) of a touch-sensor button, equation (10).

$$\Delta n \propto t_{count} * \frac{C_F * V_{TH}}{i_C}, C_F = \frac{\varepsilon \cdot A}{d} \Rightarrow \Delta n \propto A \qquad (10)$$

As previously described with respect to Equations 4-6, the Δn is the difference in counts (capacitance variation) between a stored value (baseline) for no switch actuation and the acquired value with switch actuation. The $t_{count}$ is the time to perform a scan (e.g., scan speed, Cf is the capacitance variation, $V_{TH}$ is the threshold voltage, Ic is the charging current, $\in$ is the dielectric constant of the button, A is the surface area of the button area, and d is the distance from the finger (conductive object) to the switch's conductive traces (sensor element) (through the over-lying insulator). As illustrated in the equation (10), the capacitance variation (Δn) is proportional to the surface area of the conductive material of the sensor element. Accordingly, by increasing the surface area (A) of a button (sensor element), the capacitance variation and the sensitivity of the button is increased. Conversely, by decreasing the surface area of the button, the capacitance variation and the sensitivity of the button is decreased.

Similarly, the charge time and charging current are proportional to the surface area of the sensor element (e.g., button), as illustrated in equation (11).

$$C = \frac{\varepsilon \cdot A}{d}, C = \frac{t_{count} * i_C}{V_{TH}} \Rightarrow t_{count} * i_C \propto A \quad (11)$$

Figure 6C:
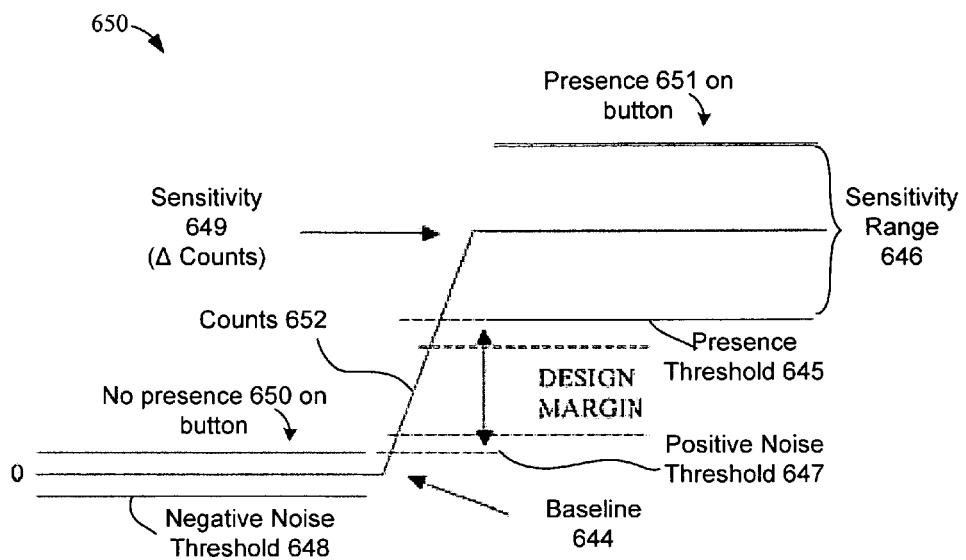
FIG. 6C illustrates a graph of a sensitivity of a single touch-sensor button.

FIG. 6C illustrates a graph of a sensitivity of a single touch-sensor button. Graph 650 includes the counts 652 as measured on a single touch-sensor button for "no presence" 650 on the touch-sensor button, and for "presence" 651 on the touch-sensor button. "No presence" 650 is when the sensing device does not detect the presence of the conductive object, such as a finger. "No presence" 650 is detected between a range of noise. The range of noise may include a positive noise threshold 647 and a negative noise threshold 648. So long as the counts 652 are measured as being between the positive and negative thresholds 647 and 648, the sensing device detects "no presence" 650. "Presence" 651 is when the sensing device detects the presence of the conductive object (e.g., finger). "Presence" 651 is detected when the counts 652 are greater than a presence threshold 645. The presence threshold 645 indicates that a presence of a conductive object is detected on the sensing device. The sensitivity 649 (Cf/Cp) of the single button operation is such that when it detects the presence of the conductive object, the capacitance variation (Δn) is above the presence threshold 645. The sensitivity 649 may have a range, sensitivity range 646. Sensitivity range 646 may have a lower and upper limit or threshold. The lower threshold is equal to or greater than the presence threshold 645, allowing a "presence" 651 to be detected on the touch-sensor button. The sensing device may be configured such that there is a design margin between the presence threshold 645 and the positive noise threshold 647. The sensitivity range 646 is based on the surface area of the touch-sensor button.

Figure 6D:
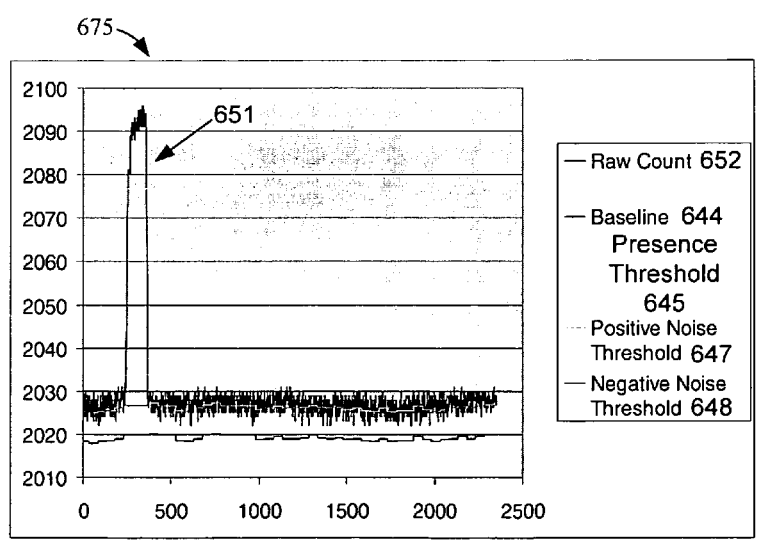
FIG. 6D illustrates a graph of capacitance measured on a single touch-sensor button.

FIG. 6D illustrates a graph of capacitance measured on a single touch-sensor button. Graph 675 illustrates the measured capacitance as raw counts 652, as well as the baseline 644, the presence threshold 645, positive noise threshold 647, and the negative noise threshold 648. As illustrated in graph 675, the raw counts 652 increase above the presence threshold 645, which is at approximately 2075 counts, the presence of the finger is detected on the sensing device. Although the presence threshold 645 is illustrated as being at 2075, and the baseline at 2025, other values may be used.

Figure 7A:
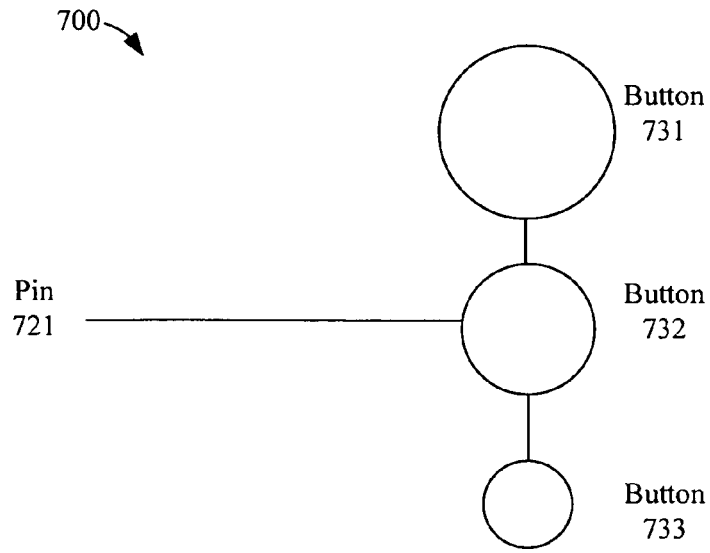
FIG. 7A illustrates one embodiment of a sensing device that has three touch-sensor buttons coupled to one pin.

FIG. 7A illustrates one embodiment of a sensing device 700 that has three touch-sensor buttons 631-633 coupled to one pin 721. Sensing device 700 has three buttons 731, 732, and 733, which are each coupled to a single pin, pins 721. Button 731 corresponds to a first button operation, button 732 corresponds to a second button operation, and button 733 corresponds to a third button operation. In other words, as button 731 is touched, the sensing device 700 recognizes and performs the first button operation. Similarly, the second and third button operations are recognized and performed when the buttons 732 and 733 are touched, respectively. In this embodiment, one pin is used to detect the three button operations. Alternatively, one pin may be coupled to two or more buttons to perform two or more button operations.

Figure 7B:
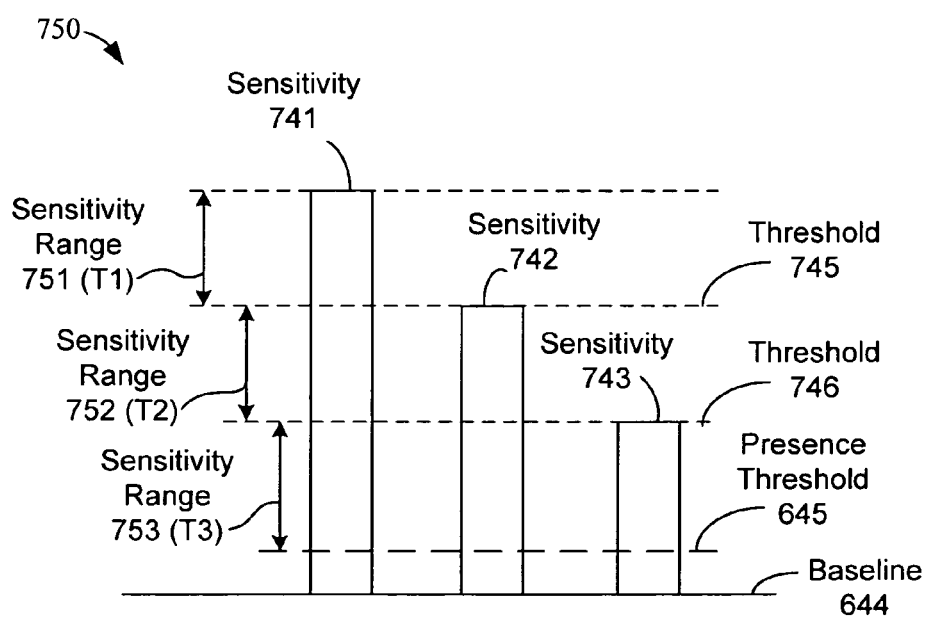
FIG. 7B illustrates a graph of one embodiment of sensitivities of the three touch-sensor buttons of FIG. 7A.

FIG. 7B illustrates a graph 750 of one embodiment of sensitivities 741-743 of the three touch-sensor buttons 731-733 of FIG. 7A. In one embodiment, sensing device 700 is a capacitance sensing device that detects a button operation when the sensitivity of the button is greater than a threshold. However, because there is only one pin coupled to the three buttons, the sensitivities of the three buttons are configured to all be above the threshold level. For example, as button 731 is touched (e.g., activated), the sensitivity 741 (e.g., capacitance variation) can be measured as being above a threshold 745, or alternatively, within a sensitivity range (T1) 751, which are both above the presence threshold 645. So long as the sensitivity 741 is above the threshold 745 (or within the sensitivity range 751), the button operation that corresponds to button 731 is recognized and performed. Similarly, as button 732 is touched (e.g., activated), the sensitivity 742 can be measured as being above a threshold 746, or alternatively, within a sensitivity range (T2) 752, which are both above the presence threshold 645. So long as the sensitivity 742 is above the threshold 746 (or within the sensitivity range 752), the button operation that corresponds to button 732 is recognized and performed. As button 733 is touched (e.g., activated), the sensitivity 743 can be measured as being above the presence threshold 645, but below the threshold 746, or alternatively, within a sensitivity range (T3) 753, which is above (or the lower level is equal to) the presence threshold 645. So long as the sensitivity 743 is above the presence threshold 645 and below the threshold 746 (or within the sensitivity range 753), the button operation that corresponds to button 733 is recognized and performed.

In one embodiment, the processing device 210 is configured to detect a presence of a conductive object on the sensing device 700, which has the three sensor elements that are electrically coupled. The three sensor elements correspond to the three button operations to be performed by the conductive object. The processing device 210 is also configured to distinguish a particular button operation from among the three button operations of buttons 731-733. As previously mentioned, the processing device 210 is coupled to the sensing device 700 using one single pin. Accordingly, the processing device 210 charges the sensing device using the one pin, and measures the capacitance on the sensing device (e.g., all of the sensor elements since they are electrically coupled). The raw capacitance 652 can be used to determine the capacitance variation for determining whether a finger (or other conductive object) is present on the sensing device, and for distinguishing which button has been pressed using the multiple sensitivity ranges (e.g., thresholds for the corresponding buttons). The three sensor elements (e.g., buttons 731-733) have different sensitivities because of the differing surface areas of the three sensor elements. Because the three buttons 731-733 each have different surface areas, the processing device 210 may be configured to recognize a first button operation when the presence of the conductive object is detected on button 731 when a measurement of the presence is greater than a first sensitivity threshold, sensitivity threshold 745. The processing device 210 may be configured to recognize a second button operation when the presence of the conductive object is detected on button 732 when a measurement of the presence is greater than a second sensitivity threshold 746, but lower than the sensitivity threshold 745. The processing device 210 may also be configured to recognize a third button operation when the presence of the conductive object is detected on button 733 when a measurement of the presence is greater than a third sensitivity threshold (e.g., presence threshold 645 or a threshold above the presence threshold), but lower than the sensitivity threshold 746.

In another embodiment, the processing device is configured to determine the capacitance of the conductive object on the sensing device. The presence is detected on the first sensor element (button 731) when the capacitance is greater than sensitivity threshold 745. The presence is detected on the second sensor element (button 732) when the capacitance is greater than sensitivity threshold 746, but lower than sensitivity threshold 745. The presence is detected on the third sensor element (button 733) when the capacitance is greater than a third sensitivity threshold (e.g., presence threshold 645 or a threshold above the presence threshold), but lower than sensitivity threshold 746. Accordingly, upon detecting which sensor element detected the presence of the conductive object, the processing device 210 recognizes the particular button operation that corresponds to the sensor element that detected the presence of the conductive object.

As described above, the buttons 731-733 of sensing device 700 include differing surface areas. The sensing area of button 732 is greater than the surface area of button 733. The sensing area of button 731 is greater than the surface area of button 732 and button 733. In this embodiment, the pin 721 is coupled directly to button 732. Alternatively, the pin 721 may be coupled to one of the other buttons or to conductive traces that may be used to electrically couple the buttons of the sensing device. Because the sensing area of button 732 is greater than the surface area of button 733, the sensitivity of button 732 is greater than the sensitivity of button 733. Similarly, because the sensing area of button 731 is greater than the surface area of button 732, the sensitivity of button 731 is greater than the sensitivity of button 732.

The sensing device 700 does not include a one-to-one ratio of pins to buttons, but rather a one-to-N ratio, wherein N is a number of 2 or more. Accordingly, this sensing device does not require additional pins to implement additional button operations. For example, using the one-to-N configuration in a keyboard design may require less than 101 pins to implement the 101 keyboard buttons that are present in a full keyboard.

As illustrated with respect to FIG. 7A, the sensing device may include three buttons coupled to one pin. Alternatively, the sensing device may include two or more buttons coupled to one pin, as illustrated in FIG. 8A.

Figure 8A:
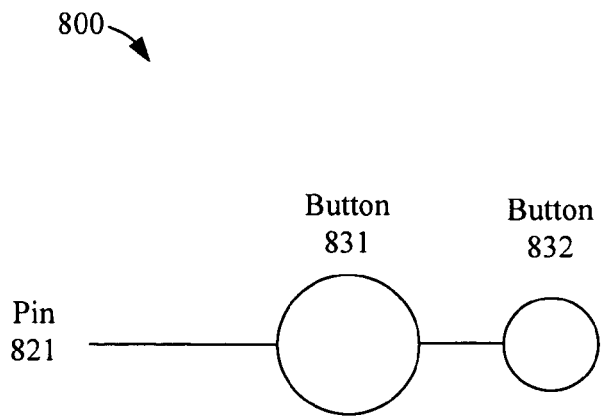
FIG. 8A illustrates one embodiment of a sensing device having two touch-sensor buttons coupled to one pin.

FIG. 8A illustrates one embodiment of a sensing device 800 having two touch-sensor buttons 831 and 832 coupled to one pin 821. Sensing device 800 is similar to the sensing device 700, except that it only has two sensor elements for the two buttons 831 and 832. The sensor elements are electrically coupled together, and are coupled to a single pin of the processing device 210, pin 821. By determining the capacitance on pin 821, two button operations may be distinguished based on the sensitivities of the two buttons 831 and 832. Since the surface area of button 831 is greater than the surface area of button 832, the sensitivity of button 831 is greater than the sensitivity of button 832. In one embodiment, the sensitivity of the button 831 may be set a first sensitivity threshold and the button 832 at a second sensitivity threshold that is less than the first sensitivity threshold. The second sensitivity threshold may be the presence threshold 645, or alternatively, a threshold above the presence threshold 645, but below the first sensitivity threshold. If the capacitance variation that is measured on the pin 821 is greater than the first threshold, the processing device 210 determines that button 831 has been activated (e.g., presence of the conductive object has been detected on the button 831). However, if the capacitance variation measured on pin 821 is less than the first threshold, but greater than the second threshold (e.g., presence threshold 645), the processing device 210 determines that button 832 has been activated (e.g., presence of the conductive object has been detected on the button 832).

Figure 8B:
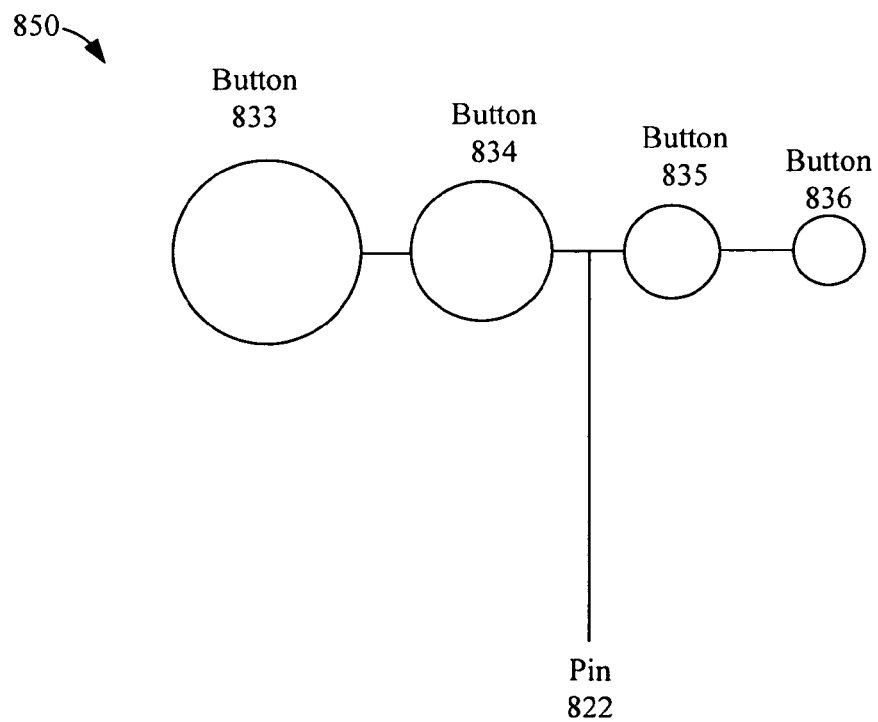
FIG. 8B illustrates one embodiment of a sensing device having four touch-sensor buttons coupled to one pin.

FIG. 8B illustrates one embodiment of a sensing device 850 having four touch-sensor buttons 833-836 coupled to one pin 822. Sensing device 850 is similar to the sensing device 800, except that it has four sensor elements for the four buttons 833-836, rather than only two. The sensor elements are electrically coupled together, and are coupled to a single pin of the processing device 210, pin 822. By determining the capacitance on pin 822, four button operations may be distinguished based on the sensitivities of the four buttons 833-836. The surface area of button 833 being the largest and the surface area of button 836 being the smallest, the surface area of the buttons decrease in size from button 833 to button 836. Similarly, the sensitivity of the buttons decrease from button 833 to button 836. In one embodiment, the sensitivities of the buttons 833-836 may be set at a first sensitivity threshold for button 833, a second sensitivity threshold of button 834, a third sensitivity threshold for button 835, and a fourth sensitivity threshold of button 836. The sensitivity thresholds decrease in value from the first sensitivity threshold to the fourth sensitivity threshold. The fourth sensitivity threshold may be the presence threshold 645, or alternatively, a threshold above the presence threshold 645, but below the third sensitivity threshold. If the capacitance variation that is measured on the pin 822 by the processing device 210 is greater than the first threshold, the button 833 has been activated; greater than the second threshold, but less than the first threshold, the button 834 has been activated; greater than the third threshold, but less than the second threshold, the button 835 has been activated; and greater than the fourth threshold, but less than the third threshold, the button 836 has been activated.

Figure 9A:
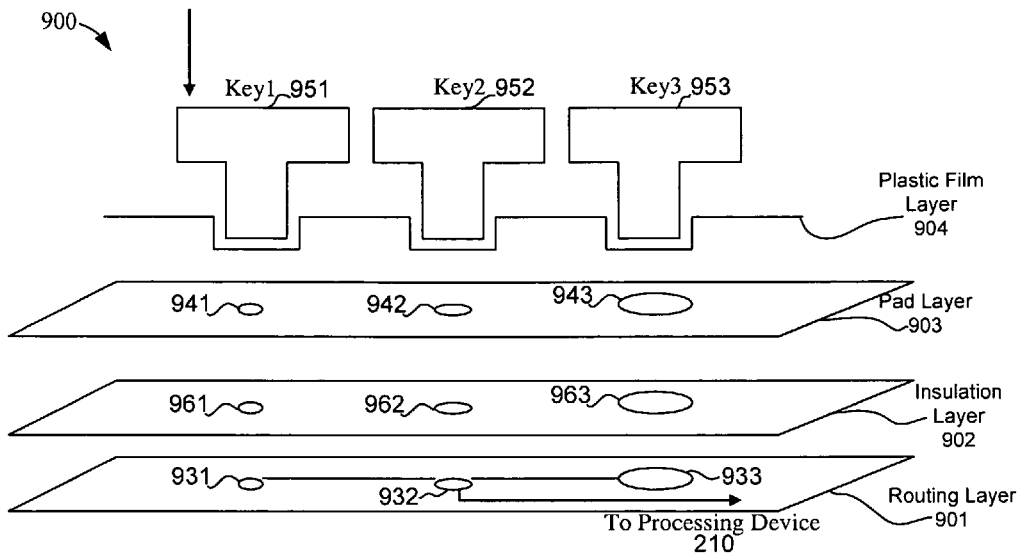
FIG. 9A illustrates one embodiment of a sensing device having three keyboard keys and three sensor elements.

FIG. 9A illustrates one embodiment of a sensing device 900 having three keyboard keys 951-953 and three sensor elements 931-933. Sensing device 900 includes four layers, routing layer 901, insulation layer 902, pad layer 903, and plastic film layer 904. The routing layer 901 includes three sensor elements 931-933 that are electrically coupled together. The three sensor elements 931-933 are coupled to a single pin of the processing device 210. The routing layer 901 may be the sensing side of the PCB, described herein. Insulation layer 902 may be an insulating cover, a flexible membrane, or a transparent overlay. The insulation layer 902 may be a dielectric material The insulation layer 902 may be non-conductive material used to protect the circuitry to environmental elements and to insulate the button areas of conductive material of pad layer 903 (e.g., conductive object) from the circuitry. In one embodiment, an adhesive layer may be deposited between the routing layer 901 and the insulation layer 902. The button areas 961-963 may be similar or dissimilar material to the rest of the material of the insulation layer, for example, the button areas 961-963 may be dielectric material.

Coupled to the insulation layer 902 is the pad layer 903. Pad layer 903 includes three button areas 941-943. The button areas 941-943 may include conductive material, such as copper. The material surrounding the button areas 941-943 may be non-conductive material. The button areas 941-943 of the pad layer 903 operate as the conductive object that is detected by the sensing device (e.g., routing layer 901), as described herein. The conductive material of the button areas 941-943 can be detected by the sensor elements 931-933, respectively, when the button areas 941-943 approach the routing layer 901 when the keyboard keys 951-953 have been pressed. For example, when force is applied to keyboard key 951, the keyboard key 951 presses against the portion of the pad layer 903 that includes button area 941. When force that is applied against the portion of the pad layer 903 that includes button area 941, the button area 941 approaches, or gets closer to, the sensor element 931 of routing layer 901. As the button area 941 is approaches the sensor element 931, the capacitance on the sensor element 931 increases. The capacitance variation can be measured on the sensor element 931 to determine that the keyboard key 951 has been pressed, as described below. Similarly, when keyboard keys 952 or 953 are pressed, the button areas 942 or 943 are detected as conductive objects by the sensor elements 932 or 933 of the routing layer.

In one embodiment, a plastic film layer 904 is coupled between the keyboard keys 951-953 and the pad layer 903. The plastic film layer 904 is used to evenly distribute the force applied to the keyboard key to be applied to the pad layer 903 at the portion that includes the button areas (e.g., copper of pad layer). Despite the size of the object (e.g., finger) that is applied to keyboard key, a uniform application of force is applied to the pad layer 903. This provides consistency in the capacitance measured on the routing layer 901.

The keyboard keys 951-953 are mechanical buttons that can be pressed towards the sensing device. These buttons are known by those of ordinary skill in the art, and accordingly, details regarding the buttons are not included so as to not obscure the description of the present embodiments. Similarly, the insulation layer 902 and plastic film layer 904 are known by those of ordinary skill in the art, and details regarding these layers have not been included.

The embodiments illustrated and described with respect to FIG. 9 may be a simpler and/or more economical than traditional keyboard designs. The sensing device 900 that is used for keyboard functionality may include fewer pins than conventional keyboards. For example, in a full-size keyboard of 101 keys, the conventional keyboards requires 101 pins, while the sensing device 900 may be implemented with less than 101 pins, depending on the sensitivity ranges of the sensor elements of the pad layer 901. For example, 20 pins may be used to implement a full-size keyboard of 101 keys. Alternatively, other number of pins may be used, such as 16. The number of pins may also depend on the number of keyboard keys that may be pressed at the same time, such as keys that are pressed with "CNTRL" or "Shift" buttons (e.g., S, V, C, X, or the like).

The embodiments describe herein with respect to FIG. 9A may be implemented in a sensing device having one keyboard key. Alternatively, the sensing device may have two or more keyboard keys. For example, a full-size keyboard may be implemented using the sensing device, for example, 48, 83, 84, 101, 102, 104, 105, 107, or more keyboard keys. They keyboard may have a layout, such as QWERTY, Dvorak, foreign-language layouts (e.g. "keyboard AZERTY" in French-speaking countries), a space-cadet, or APL keyboard layouts. Alternatively, other customized layouts may be used.

In one embodiment, the keyboard may be a PC keyboard. The PC keyboard has evolved over time to include more keys. For example, the PC/XT keyboard layout has 83 keyboard keys. It includes original left hand side function key (F key) columns with 10 keys F1 through F10. These types of keyboards may not be compatible with later keyboard types. The PC/AT keyboard layout includes 84 keys, and the 84$^{th}$ key is the system request key (e.g., SysRq). The numerical block is clearly separated from the main keyboard, and they PC/AT layout includes indicator LEDs for Caps/Scroll/NumLock. One enhanced keyboard layout includes 101 keyboard keys. This enhanced layout includes additional navigation and control keys, 12 function keys in row along the top of the main keyboard, often grouped as F1-F4, F5-F8, and F9-12. Another enhanced layout includes 102 keyboard keys. This layout is similar to the layout of 101 keys, but includes an additional key to the right of the left Shift key for European layouts. Another enhanced layout is the Windows® keyboard layout, which includes additional keys for the Windows® key (which provides a shortcut to open the "Start" menu in Windows® standard Explorer shell) and menu keys. Correspondingly, the European layouts included 105 keys for the additional key to the right of the left Shift key. An additional enhanced layout includes 107 keyboard keys, which includes the additional keys, such as Wake, Sleep, and Power keys for power management functionality. Alternatively, there are additional enhanced layouts that are called multimedia keyboard layouts, which may offer additional buttons to the 104 or 107 "standard" keys, often providing volume control, media player buttons, and miscellaneous user-configurable shortcuts, e.g., to email clients, web browsers, document folders, applications, etc. It should be noted that the embodiments described herein are not limited to PC keyboards, and PC keyboard keys, but may include other keyboard keys for other platforms and other systems.

Figure 9B:
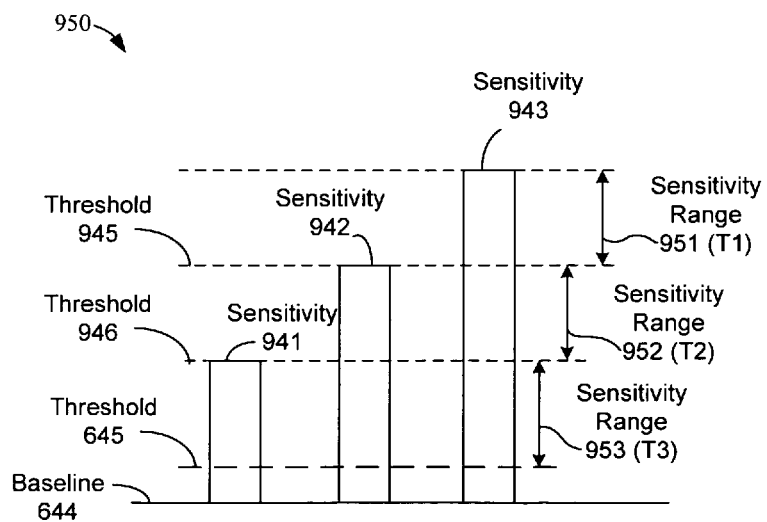
FIG. 9B illustrates a graph of one embodiment of the sensitivities of the three button areas of the sensing device of FIG. 9A.

FIG. 9B illustrates a graph 950 of one embodiment of the sensitivities of the three sensor elements 931-933 of the sensing device 900 of FIG. 9A. As described above, since the three sensor elements 931-933 are coupled together, in order to distinguish between the three button operations of the three keyboard keys 951-953, the sensor elements 931-933 have different surface areas. By having different surface areas the sensor elements 931-933 have different sensitivity ranges. In one embodiment, the sensor element 933 has a sensitivity 943 that is above a first sensitivity threshold 945. A button operation that corresponds to the keyboard key 953 being pressed is recognized and performed if the capacitance variation (sensitivity 941) is within the sensitivity range 951 (T1). The sensor element 932 has a sensitivity 942 that is above a second sensitivity threshold 946 and below the first sensitivity threshold 945. A button operation that corresponds to the keyboard key 952 being pressed is recognized and performed if the capacitance variation (sensitivity 942) is within the sensitivity range 952 (T2). The sensor element 931 has a sensitivity 941 that is above a third sensitivity threshold (e.g., presence threshold 645 or a threshold above the presence threshold 645) and below the second sensitivity threshold 946. A button operation that corresponds to the keyboard key 951 being pressed is recognized and performed if the capacitance variation (sensitivity 941) is within the sensitivity range 953 (T3).

In another embodiment, the sensor element are not electrically coupled together in a multiple-button per pin configuration as described with respect to FIGS. 9A and 9B, but are configured in a one-button per pin configuration. In this embodiment, the number of pins is equal to the number of buttons implemented in the sensing device. This configuration may allow the user to have a mechanical feel for pressing the physical button. This configuration, however, may increase the cost of the device due to the increased number of pins. Alternatively, some sensor elements of the sensing device may be electrically coupled in multiple-button per pin configuration and others in one-button per pin configurations.

Embodiments of the present invention, described herein, include various operations. These operations may be performed by hardware components, software, firmware, or a combination thereof. As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a machine-readable medium. These instructions may be used to program a general-purpose or special-purpose processor to perform the described operations. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; electrical, optical, acoustical, or other form of propagated signal (e.g., carrier waves, infrared signals, digital signals, etc.); or another type of medium suitable for storing electronic instructions.

Additionally, some embodiments may be practiced in distributed computing environments where the machine-readable medium is stored on and/or executed by more than one computer system. In addition, the information transferred between computer systems may either be pulled or pushed across the communication medium connecting the computer systems.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. An apparatus, comprising:
   a sensing device having a plurality of sensor elements that are electrically coupled to detect a presence of a conductive object on the sensing device, wherein the plurality of sensor elements correspond to a plurality of button operations;
   a keyboard coupled to the sensing device, wherein the keyboard comprises a plurality of keys that correspond to the plurality of sensor elements; and
   a processing device coupled to the sensing device to distinguish a particular button operation from among the plurality of button operations when a particular key of the plurality of keys of the keyboard is pressed, wherein the sensing device comprises:
   a routing layer comprising the plurality of sensor elements, wherein the routing layer is coupled to the processing device;
   a pad layer comprising conductive material in button areas that corresponds to the plurality of keys and the plurality of sensor elements, wherein each of the button areas is configured to operate as the conductive object that is detected by the routing layer when the particular key is pressed, wherein the processing device is configured to measure capacitances on the plurality of sensor elements to detect the presence of the conductive object when one of the plurality of keys is pressed, and wherein the pad layer does not directly contact the routing layer when the particular key is pressed; and
   an insulating layer configured to electrically isolate the pad layer and the routing layer when the processing device measures the capacitances, wherein the insulating layer is disposed between the routing layer and the pad layer.

2. The apparatus of claim 1, further comprising a plastic film layer coupled between the plurality of keys and the pad layer of the sensing device.

3. The apparatus of claim 2, wherein the plastic film layer is configured to evenly distribute a force applied to one of the plurality of keys being pressed to the corresponding button areas of the pad layer.

4. The apparatus of claim 1, wherein a first key of the plurality of keys has a larger corresponding conductive material than a second key of the plurality of keys.

5. The apparatus of claim 4, wherein the processing device is configured to recognize that the first key has been pressed when the presence of the corresponding conductive material of the pad layer is detected on a first sensor element of the plurality of sensor elements in the routing layer, and to recognize that the second key has been pressed when the presence of the corresponding conductive material of that pad layer is detected on a second sensor element of the plurality of sensor elements in the routing layer.

6. The apparatus of claim 1, wherein a first sensor element of the plurality of sensor elements in the routing layer comprises a first sensitivity and a second sensor element of the plurality of sensor elements in the routing layer comprises a second sensitivity, wherein the first sensitivity is greater than the second sensitivity, and wherein the processing device is configured to distinguish the particular key that has been pressed based on the first sensitivity of the first sensor element and the second sensitivity of the second sensor element.

7. The apparatus of claim 6, wherein the first and second sensor elements are electrically coupled.

8. The apparatus of claim 6, wherein the first and second sensor elements are coupled to the processing device using one pin.

9. The apparatus of claim 1, wherein the processing device is configured to determine a capacitance on the sensing device, and wherein processing device is configured to recognize that a first key of the plurality of keys is pressed when the capacitance is greater than a first sensitivity threshold and that a second key of the plurality of keys of plurality of keys is pressed when the capacitance is less than the first sensitivity threshold and greater than a second sensitivity threshold.

10. The apparatus of claim 9, wherein the first and second sensitivity thresholds are greater than a presence threshold, wherein the presence threshold is configured to indicate the detected presence of the conductive object by the routing layer.

* * * * *